United States Patent
Lee et al.

(10) Patent No.: US 9,052,549 B2
(45) Date of Patent: Jun. 9, 2015

(54) LIQUID CRYSTAL DISPLAY AND MANUFACTURING METHOD THEREOF

(75) Inventors: Jun-Woo Lee, Anyang-si (KR); Jong-Sung Bae, Hwaseong-si (KR); Hoi-Lim Kim, Eujeongbu-si (KR); Baek-Kyun Jeon, Yongin-si (KR); Suk-Hoon Kang, Seoul (KR); Jin-Soo Jung, Goyang-si (KR); Soo-Ryun Cho, Gunpo-si (KR); Hyun Ku Ahn, Hwaseong-si (KR); Joo Seok Yeom, Seoul (KR); Kyoung Tae Kim, Osan-si (KR); Gyo-Jic Shin, Hwaseong-si (KR); Eun Ju Kim, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 214 days.

(21) Appl. No.: 13/359,702

(22) Filed: Jan. 27, 2012

(65) Prior Publication Data

US 2012/0196054 A1 Aug. 2, 2012

Related U.S. Application Data

(63) Continuation-in-part of application No. 12/483,630, filed on Jun. 12, 2009.

(30) Foreign Application Priority Data

Nov. 27, 2008 (KR) .................. 10-2008-0118940
Apr. 5, 2011 (KR) .................. 10-2011-0031212

(51) Int. Cl.
*C09K 19/00* (2006.01)
*G02F 1/1333* (2006.01)

(Continued)

(52) U.S. Cl.
CPC ...... *G02F 1/133723* (2013.01); *B32B 2457/202* (2013.01); *G02F 1/133788* (2013.01); *G02F 2001/133397* (2013.01);

(Continued)

(58) Field of Classification Search
None
See application file for complete search history.

(56) References Cited

U.S. PATENT DOCUMENTS 5,693,379 A * 12/1997 Sugimori et al. ............ 428/1.26
6,201,588 B1 3/2001 Walton et al.

(Continued)

FOREIGN PATENT DOCUMENTS

CN 1825176 A 8/2006
EP 1020442 A1 7/2000

(Continued)

OTHER PUBLICATIONS

Office action dated Apr. 9, 2015 in U.S. Appl. No. 12/483,630.

*Primary Examiner* — Ellen S Wood
*Assistant Examiner* — Anthony J Frost
(74) *Attorney, Agent, or Firm* — Cantor Colburn LLP

(57) ABSTRACT

A liquid crystal display including: a first substrate and a second substrate facing each other; an alignment layer disposed on one of the first substrate and the second substrate and including a vertical photo-alignment material which includes a first vertical functional group and a photo-reactive group, and a major alignment material which does not include the photo-reactive group; and a liquid crystal layer disposed between the first substrate and the second substrate, wherein a ratio of a molar concentration of the vertical photo-alignment material to the molar concentration of the major alignment material increases in a direction towards a surface of the alignment layer adjacent to the liquid crystal layer.

22 Claims, 16 Drawing Sheets

(51) Int. Cl.
*G02F 1/1337* (2006.01)
*G09G 3/36* (2006.01)
*C08G 73/00* (2006.01)
*C08G 73/10* (2006.01)
*G02F 1/1362* (2006.01)
*G02F 1/1343* (2006.01)

(52) U.S. Cl.
CPC ..... *G09G 3/3659* (2013.01); *G09G 2300/0814* (2013.01); *G09G 2300/0876* (2013.01); *C08G 73/00* (2013.01); *C08G 73/10* (2013.01); *G02F 1/136209* (2013.01); *G02F 1/136213* (2013.01); *G02F 1/13624* (2013.01); *G02F 2001/133742* (2013.01); *G02F 2001/134345* (2013.01); *G02F 2001/134354* (2013.01); *G02F 2201/122* (2013.01); *G02F 2203/30* (2013.01)

(56) References Cited

U.S. PATENT DOCUMENTS

| | | | |
|---|---|---|---|
| 6,218,501 | B1 | 4/2001 | Choi et al. |
| 6,238,752 | B1 * | 5/2001 | Kato et al. .............. 428/1.26 |
| 6,613,245 | B1 | 9/2003 | Ohlemacher et al. |
| 7,037,443 | B2 * | 5/2006 | Shuto et al. ............. 252/299.01 |
| 7,396,572 | B2 * | 7/2008 | Kim et al. .............. 428/1.26 |
| 7,782,430 | B2 | 8/2010 | Chida et al. |
| 8,057,868 | B2 | 11/2011 | Terashita et al. |
| 8,395,734 | B2 | 3/2013 | Park |
| 8,654,289 | B2 | 2/2014 | Park |
| 2003/0232930 | A1 | 12/2003 | Gibbons et al. |
| 2005/0260334 | A1 * | 11/2005 | Kwok et al. ............. 427/58 |
| 2006/0035086 | A1 * | 2/2006 | Amos et al. ............ 428/411.1 |
| 2006/0186913 | A1 | 8/2006 | Kim |
| 2006/0194000 | A1 | 8/2006 | Schadt et al. |
| 2006/0280880 | A1 | 12/2006 | Park |
| 2010/0085523 | A1 | 4/2010 | Terashita et al. |
| 2010/0188628 | A1 | 7/2010 | Kwak et al. |
| 2010/0305230 | A1 | 12/2010 | Li et al. |
| 2011/0007254 | A1 * | 1/2011 | Terashita et al. ........... 349/123 |

FOREIGN PATENT DOCUMENTS

| | | | | |
|---|---|---|---|---|
| EP | 2259133 | A1 | 12/2010 | |
| JP | 08120078 | A | 5/1996 | |
| JP | 10268318 | A | 10/1998 | |
| JP | 2002174725 | A | 6/2002 | |
| JP | 2003-043492 | A | 2/2003 | |
| JP | 2003073471 | A | 3/2003 | |
| JP | 2003161946 | A | 6/2003 | |
| JP | 2005053766 | A | 3/2005 | |
| JP | 2006512422 | A | 4/2006 | |
| JP | 2007304509 | A | 11/2007 | |
| JP | 2008076950 | A | 4/2008 | |
| JP | 4168593 | B2 | 10/2008 | |
| JP | WO2009107406 | * | 9/2009 | ........ G02F 1/1337 |
| JP | 5059183 | B2 | 8/2010 | |
| KR | 1020060130387 | A | 12/2006 | |
| WO | 2008117615 | A1 | 10/2008 | |

* cited by examiner

LIQUID CRYSTAL DISPLAY AND MANUFACTURING METHOD THEREOF

This application claims priority to and the benefit of Korean Patent Application No. 10-2011-0031212, filed on Apr. 5, 2011, and all the benefits accruing therefrom under 35 U.S.C. §119, the content of which in its entirety is herein incorporated by reference. This application is also a Continuation-In-Part application of U.S. patent application Ser. No. 12/483,630, filed on Jun. 12, 2009, which claims priority under U.S.C. §119 to Korean Patent Application No. 10-2008-0118940, filed on Nov. 27, 2008, the content of which in its entirety is also herein incorporated by reference.

BACKGROUND OF THE INVENTION (a) Field of the Invention

A liquid crystal display and a manufacturing method thereof are provided.

(b) Description of the Related Art

Liquid crystal displays ("LCDs") are now widely used as one type of flat panel display. An LCD includes two display panels on which field generating electrodes, such as pixel electrodes and a common electrode, are typically formed, and a liquid crystal layer is interposed between the panels. In the typical LCD, a voltage is applied to the field generating electrodes so as to generate an electric field over the liquid crystal layer, and the alignment of liquid crystal molecules of the liquid crystal layer is selected by the electric field. Accordingly, the polarization of incident light is controlled, thereby varying light transmission through the LCD and allowing for image display.

An alignment layer is typically formed on an inner surface of the display panels to align liquid crystal molecules of the liquid crystal layer. If no voltage is applied to the field generating electrodes, the liquid crystal molecules of the liquid crystal layer are aligned in a predetermined direction by way of the alignment layer. When a voltage is applied to the field generating electrodes, the liquid crystal molecules of the liquid crystal layer are rotated in the direction of the electric field.

Nonetheless, there remains a need for improved materials for the alignment layer.

BRIEF SUMMARY OF THE INVENTION

An exemplary embodiment improves stability while reducing afterimages and spots of a liquid crystal display.

A liquid crystal display according to an exemplary embodiment includes: a first substrate and a second substrate facing each other; an alignment layer disposed on one of the first substrate and the second substrate, the alignment layer including a vertical photo-alignment material which includes a first vertical functional group and a photo-reactive group, and a major alignment material which does not include the photo-reactive group; and a liquid crystal layer disposed between the first substrate and the second substrate, wherein a ratio of a molar concentration of the vertical photo-alignment material to a molar concentration of the major alignment material increase in a direction towards a surface of the alignment layer adjacent to the liquid crystal layer.

The vertical photo-alignment material may include a photo-reactive diamine group and a vertical diamine group.

The vertical photo-alignment material may include the photo-reactive diamine group in an amount of about 40 mole percent (mol %) to about 70 mol %, based on the total moles of the vertical photo-alignment material, and the vertical diamine group in an amount of about 10 mol % to about 40 mol %, based on the total moles of the vertical photo-alignment material.

The vertical photo-alignment material may include two or more types of photo-reactive diamine groups.

The vertical photo-alignment material may include a normal diamine group which does not include both the photo-reactive group and the vertical functional group.

The vertical photo-alignment material may include the normal diamine group in an amount of less than about 20 mol %, based on the total moles of the vertical photo-alignment material.

The alignment layer may include the photo-reactive diamine group in an amount of about 4 mol % to about 28 mol %, based on the total moles of the vertical photo-alignment material, the vertical diamine group in an amount of about 1 mol % to about 16 mol %, based on the total moles of the vertical photo-alignment material, and the normal diamine group in an amount of about 60 mol % to about 92 mol %, based on the total moles of the vertical photo-alignment material.

The vertical photo-alignment material may be a polyamic acid compound represented by Formula 22, or a polyimide compound represented by Formula 23:

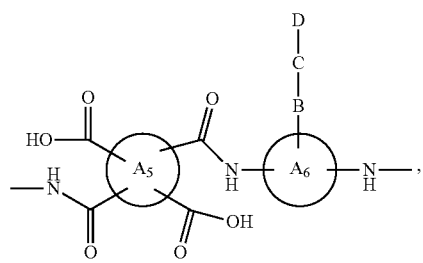

Formula 22

-continued

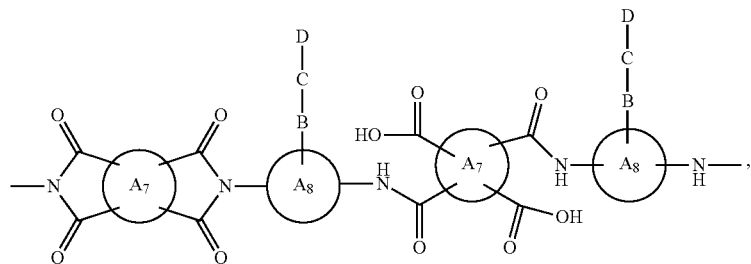

Formula 23 wherein, in Formula 22 and Formula 23, $A_5$-$A_8$ are each independently a substituted or unsubstituted $C_6$-$C_{24}$ aryl group or a substituted or unsubstituted $C_3$-$C_{24}$ cycloalkyl group, B is a flexible group, C is a photo-reactive group, and D is a vertical functional group.

The major alignment material may be a polyamic acid compound represented by Formula 24, or a polyimide compound represented by Formula 25:

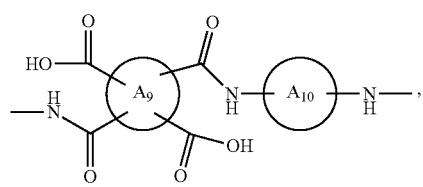

Formula 24

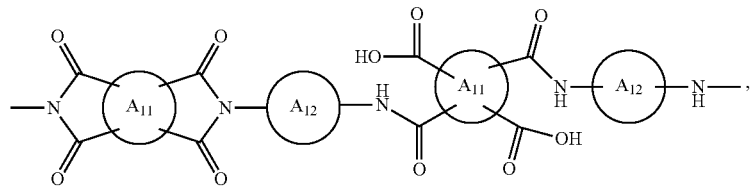

Formula 25 wherein, in Formula 24 and Formula 25, $A_9$-$A_{12}$ are each independently a substituted or unsubstituted $C_6$-$C_{24}$ aryl group or a substituted or unsubstituted $C_3$-$C_{24}$ cycloalkyl group.

A position of the first vertical functional group in the alignment layer may be selected based on a ratio of the molar concentration of the vertical photo-alignment material to the molar concentration of the major alignment material.

The first vertical functional group may be disposed a distance of about 5 percent (%) to about 50% of a thickness of the alignment layer from a surface of the alignment layer adjacent to the crystal layer.

A weight ratio of the vertical photo-alignment material and the major alignment material may be about 10:90 to about 40:60.

The major alignment material may include the third vertical functional group in an amount of less than about 5 mol %, based on the total moles of the major alignment material.

The vertical photo-alignment material may include an imide group in an amount of about 40 mol % to about 70 mol %, based on the total moles of the vertical photo-alignment material.

The major alignment material may include an imide group in an amount of about 50 mol % to about 80 mol %, based on the total moles of the major alignment material.

The liquid crystal display may further include a first switching element connected to the first gate line and a data line, a second switching element connected to the first gate line and the data line, and a third switching element connected to the second gate line and the second switching element.

The liquid crystal display may further include a first liquid crystal capacitor connected to the first switching element, a second liquid crystal capacitor connected to the second switching element, and a transformation capacitor including two terminals of the third switching element and a common voltage line.

The liquid crystal display may further include a first liquid crystal capacitor connected to the first switching element, a second liquid crystal capacitor connected to the second switching element, and a third liquid crystal capacitor connected to the third switching element.

The liquid crystal display may further include a first switching element connected to the gate line and the first data line and a second switching element connected to the gate line and the second data line.

The liquid crystal display may further include a first liquid crystal capacitor connected to the first switching element and a second liquid crystal capacitor connected to the second switching element.

With an LCD according to an exemplary embodiment, an aliment layer thereof includes a vertical photo-alignment material and a major alignment material, and may be formed using ultraviolet rays and without a rubbing process, thereby reducing afterimage and spot occurrences.

BRIEF DESCRIPTION OF THE DRAWINGS

The above and other aspects, advantages, and features of the invention will become more apparent by describing in further detail exemplary embodiments thereof with reference to the attached drawings, in which.

DETAILED DESCRIPTION OF THE INVENTION

Figure 1:
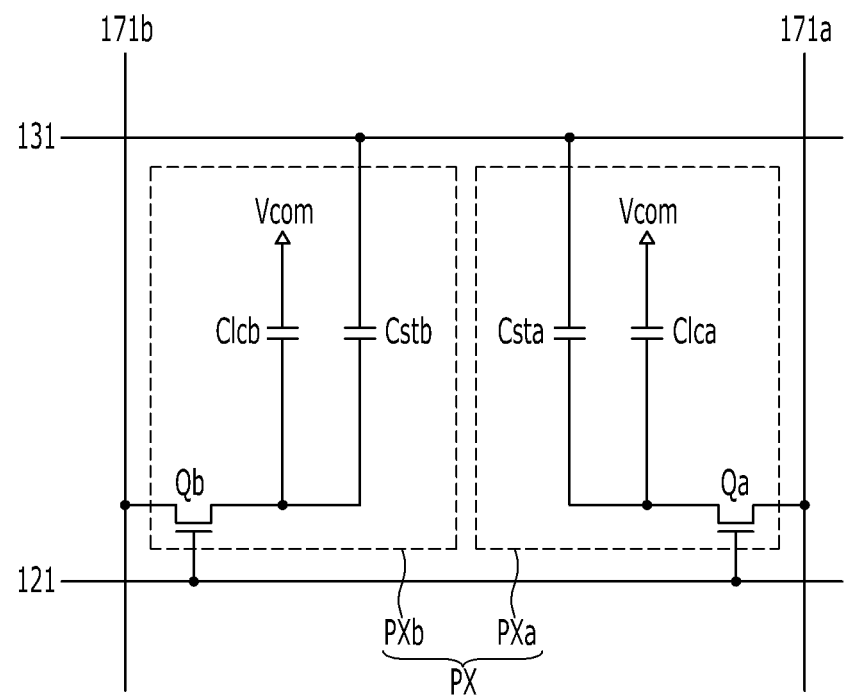
FIG. 1 is an equivalent circuit diagram of an exemplary embodiment of a pixel in a liquid crystal display ("LCD")

The invention now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. It will be understood that when an element is referred to as being "on" another element, it can be directly on the other element or intervening elements may also be present therebetween. In contrast, when an element is referred to as being "directly on" another element, there are no intervening elements present. As used herein, the term "and/or" includes any and all combinations of one or more of the associated listed items. It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section without departing from the teachings of the present invention. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the disclosed embodiments will be described in detail with reference to the accompanying drawings.

"Alkyl" means a straight or branched chain, saturated, monovalent hydrocarbon group (e.g., methyl or hexyl).

"Alkylene" means a straight or branched chain, saturated, divalent aliphatic hydrocarbon group, (e.g., methylene (—$CH_2$—) or, propylene (—$(CH_2)_3$—)).

"Alkenyl" means a straight or branched chain, monovalent hydrocarbon group having at least one carbon-carbon double bond (e.g., ethenyl (—HC=$CH_2$)).

"Alkoxy" means an alkyl group that is linked via an oxygen (i.e., alkyl-O—), for example methoxy, ethoxy, and sec-butyloxy groups.

"Aryloxy" means an aryl moiety that is linked via an oxygen (i.e., —O-aryl).

"Aryl" means a cyclic group in which all ring members are carbon and all rings are aromatic, the group having the specified number of carbon atoms, and having a valence of at least one, optionally substituted with one or more substituents where indicated, provided that the valence of the aryl group is not exceeded. More than one ring may be present, and any additional rings may be fused, pendant, spirocyclic, or a combination thereof.

"Cycloalkyl" means a group that includes one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups, and having a valence of at least one, and optionally substituted with one or more substituents where indicated, provided that the valence of the alkyl group is not exceeded. Cycloalkyl groups do not include an aromatic ring or a heterocyclic ring. When the numbers of carbon atoms is specified (e.g., C3 to C15 cycloalkyl), the number means the number of ring members present in the one or more rings.

The prefix "halo" means a group or compound including one more of a fluoro, chloro, bromo, iodo, or astatino substituent. A combination of different halo groups (e.g., bromo and fluoro) can be present.

"Substituted" means that a compound or radical substituted with at least one a substituent independently a halogen (e.g., $F^-$, $Cl^-$, $Br^-$, $I^-$), a C1-C12 haloalkyl group, a C1-C12 alkyl group, a C1-C12 alkoxy group, a C6-C12 aryl group, or a C6-C12 aryloxy group, instead of hydrogen, provided that the substituted atom's normal valence is not exceeded.

Figure 2:
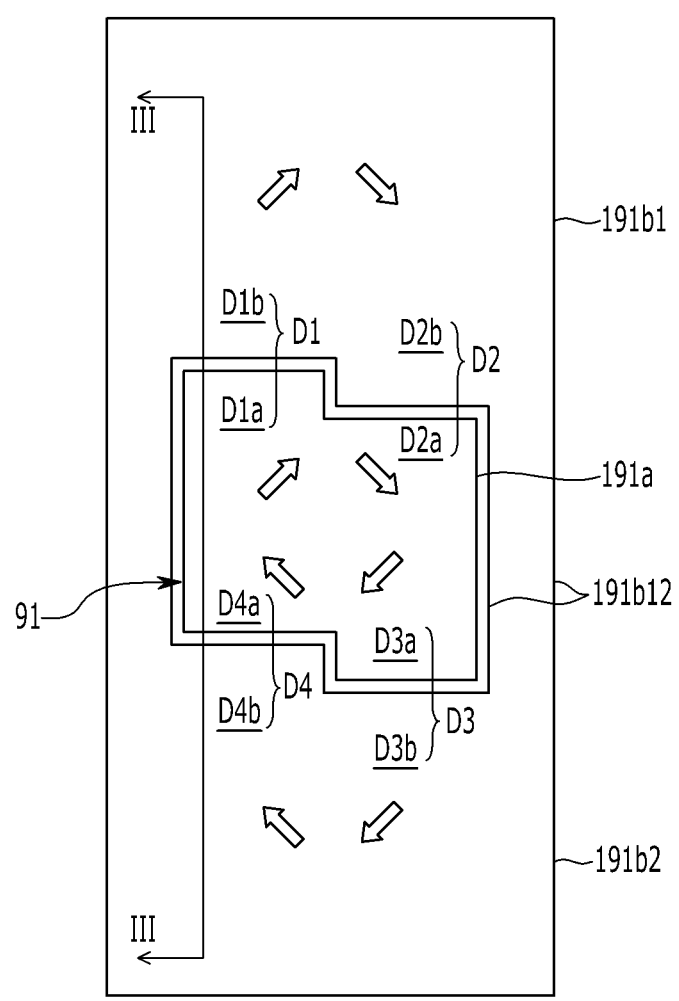
FIG. 2 is a top plan layout view of an exemplary embodiment of a pixel electrode in an LCD.
Figure 3:
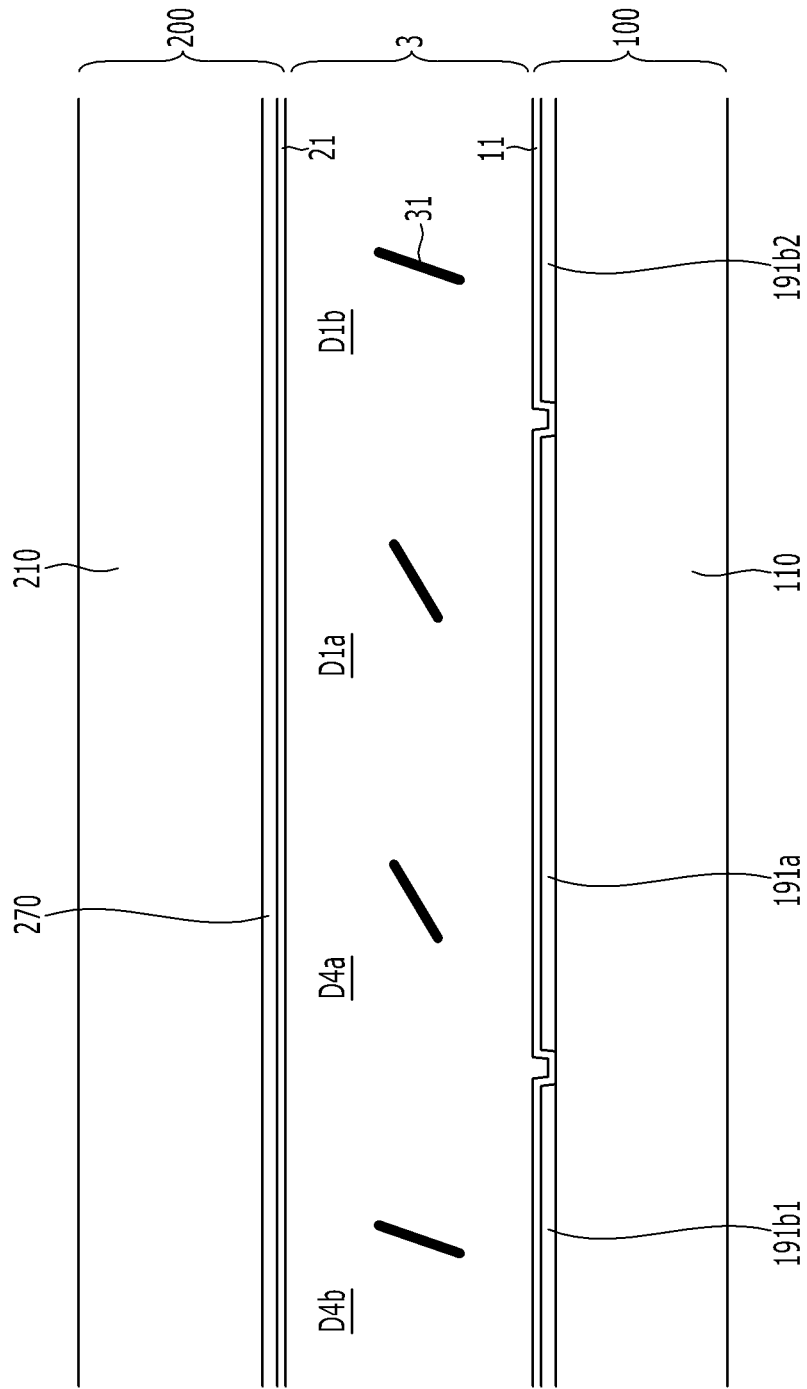
FIG. 3 is a schematic cross-sectional view of an exemplary embodiment of an LCD with the pixel electrode shown in FIG. 2 taken along line III-III.

FIG. 1 is an equivalent circuit diagram of an exemplary embodiment of a pixel in a liquid crystal display ("LCD"), and FIG. 2 is a top plan layout view of an exemplary embodiment of a pixel electrode in an LCD. FIG. 3 is a schematic cross-sectional view of an exemplary embodiment of an LCD with the pixel electrode shown in FIG. 2 taken along line III-III.

Referring to FIG. 1, an exemplary embodiment of an LCD includes a plurality of signal lines 121, 131, 171a, and 171b, and pixels PX connected thereto.

Referring to FIG. 2 and FIG. 3, the exemplary embodiment of an LCD includes lower and upper display panels 100 and 200 facing each other, and a liquid crystal layer 3 interposed between the two panels 100 and 200. Pixel electrodes 191 are disposed (e.g., formed) on the lower display panel 100, and a common electrode 270 is disposed (e.g., formed) on the upper display panel 200.

Alignment layers 11 and 21 are disposed (formed) on the pixel and common electrodes 191 and 270, respectively. A detailed description of the alignment layers 11 and 21 will be given later.

In the present exemplary embodiment, the pixel electrode 191 includes first and second subpixel electrodes 191a and 191b, which are separated from each other.

The signal lines 121, 131, 171a and 171b are formed on the lower panel 100, and include gate lines 121 for transmitting gate signals, a pair of data lines 171a and 171b for transmitting data voltages, and storage electrode lines 131 for storing storage voltages. Exemplary embodiments include configurations including only a single data line per pixel. Exemplary embodiments also include configurations wherein the storage electrode line is omitted.

In the present exemplary embodiment, the pixels PX each include a pair of subpixels PXa and PXb, each of which includes switching elements Qa and Qb, liquid crystal capacitors Clca and Clcb, and storage capacitors Csta and Cstb.

In the present exemplary embodiment, the switching elements Qa and Qb are three terminal elements with gate, source, and drain electrodes formed on the lower panel 100. The gate electrode of the switching elements Qa and Qb is connected to the gate line 121 and the source electrode thereof is connected to the data lines 171a and 171b, while the drain electrode thereof is connected to the liquid crystal capacitors Clca and Clcb and the storage capacitors Csta and Cstb. In one exemplary embodiment, the switching elements Qa and Qb may be thin film transistors ("TFTs").

The liquid crystal capacitors Clca and Clcb include the subpixel electrodes 191a and 191b of the lower display panel 100 and the common electrode 270 of the upper display panel 200 as two terminals thereof, and the liquid crystal layer interposed between the two terminals 191a and 191b and 270 as a dielectric. The subpixel electrodes 191a and 191b are connected to the switching elements Qa and Qb, and in the present exemplary embodiment the common electrode 270 is formed on substantially the entire surface of the upper display panel 200 and receives a common voltage Vcom.

The storage capacitors Csta and Cstb serve to assist the liquid crystal capacitors Clca and Clcb and are formed through overlapping the storage electrode line 131 with the pixel electrodes 191a and 191b and by interposing an insulator between the storage electrode line 131 and the pixel electrodes 191a and 191b. Exemplary embodiments include configurations wherein the storage capacitors Csta and Cstb may be omitted.

Referring to FIG. 2, in the present exemplary embodiment, the pixel electrode 191 is formed in the shape of a rectangle elongated in the vertical direction, and the first subpixel electrode 191a thereof is surrounded by the second subpixel electrode 191b.

In the present exemplary embodiment, the first subpixel electrode 191a has a shape wherein two substantially identical rectangles elongated in the vertical direction are attached to each other in an off-set configuration in the horizontal direction. In the present exemplary embodiment, the vertical direction refers to a length direction of the pixel electrode 191, .e.g., a direction substantially parallel to the data lines 171 and a horizontal direction refers to a width direction, e.g., a direction substantially parallel to the gate lines 121. In an exemplary embodiment wherein the two substantially identical rectangles are attached to each other in a non-offset configuration, they form a square. However, alternative exemplary embodiments include configurations wherein the length ratio of horizontal side to vertical side of the first subpixel electrode 191a may be altered in other ways.

The second subpixel electrode 191b surrounds the first subpixel electrode 191a with a gap 91 having a roughly uniform width, and includes an upper electrode portion 191b1 formed above the first subpixel electrode 191a, a lower electrode portion 191b2 formed below the first subpixel electrode 191a, and bridge portions 191b12 interconnecting the upper and lower electrode portions 191b1 and 191b2 on the left and right sides of the first subpixel electrode 191a.

In the present exemplary embodiment, the second subpixel electrode 191b is greater in size than the first subpixel electrode 191a, and it is possible to control the length ratio of the vertical side of the first subpixel electrode 191a to the vertical side of the second subpixel electrode 191b and obtain a desired area ratio thereof. In one exemplary embodiment, the second subpixel electrode 191b may be roughly two times the area of the first subpixel electrode 191a. In such an exemplary embodiment, the first subpixel electrode 191a, the upper electrode portion 191b1, and the lower electrode portion 191b2 may all have substantially the same area.

In the present exemplary embodiment, the liquid crystal layer 3 has negative dielectric anisotropy, and liquid crystal molecules thereof are vertically aligned. Polarizers (not shown) may be attached to the outer surfaces of substrates 110 and 210, respectively. The polarization axes of the polarizers may be substantially perpendicular to each other while being inclined with respect to the horizontal and vertical directions, e.g., the width and length directions, respectively, of the pixel electrodes 191, by about 45 degrees.

When an electric field is not generated at the liquid crystal layer 3, in other words, when there is no voltage difference between the pixel and common electrodes 191 and 270, liquid crystal molecules 31 may be oriented substantially perpendicular to the surface of the alignment layers 11 and 21, or may be slightly inclined with respect thereto.

When a potential difference is generated between the pixel and common electrodes 191 and 270, an electric field substantially perpendicular to the surface of the display panels 100 and 200 is generated at the liquid crystal layer 3. Hereinafter, the pixel electrode 191 and the common electrode 270 will be collectively referred to as the "field generating electrodes." The liquid crystal molecules 31 of the liquid crystal layer 3 are inclined in response to the electric field to be substantially perpendicular to the direction of the electric field. The polarization degree of the light incident upon the liquid crystal layer 3 is varied depending upon the inclination degree of the liquid crystal molecules 31. The variation in polarization is expressed by a variation in light transmittance by way of the polarizers so that the LCD can display images with varying grayscales.

The inclination direction of the liquid crystal molecules 31 is differentiated depending upon the characteristics of the alignment layers 11 and 21. In one exemplary embodiment, the inclination direction of the liquid crystal molecules 31 may be determined by illuminating ultraviolet rays that differ in polarization direction to the alignment layers 11 and 21, or illuminating them in a slanted manner.

Depending upon the inclination direction of the liquid crystal molecules 31, a portion of the liquid crystal layer 3 formed over the pixel electrode 191 is partitioned into four regions including the left upper D1, the right upper D2, the right lower D3, and the left lower D4. The partitioned regions D1 to D4 have substantially the same size while having the horizontal and vertical center lines of the pixel electrode 191 as boundaries thereof. The inclination directions of the liquid crystal molecules placed at the regions D1 to D4 that are adjacent to each other in the horizontal and vertical directions are angled with respect to each other by about 90 degrees, but the inclination directions of the liquid crystal molecules adjacent to each other in the diagonal direction are substantially opposite to each other.

The arrows of FIG. 2 indicate the inclination directions of the liquid crystal molecules 31, which are inclined at the left upper region D1 to be in the right upper direction, at the right upper region D2 to be in the right lower direction, at the right lower region D3 to be in the left lower direction, and at the left lower region D4 to be in the left upper direction.

However, the inclination directions of the liquid crystal molecules 31 at those four regions D1 to D4 are not limited to the exemplary embodiment discussed above, and may be altered in various manners. Furthermore, the number of inclination directions of the liquid crystal molecules 31 may be more or less than four. When the inclination directions of the liquid crystal molecules are diversified, the reference viewing angle of the LCD is increased.

In the present exemplary embodiment different voltages are applied to the first and second subpixel electrodes 191a and 191b, and based on the magnitude of the common voltage Vcom, the relative voltage of the first subpixel electrode 191a is generally higher than the relative voltage of the second subpixel electrode 191b. The inclination angle of the liquid crystal molecules is differentiated depending upon the intensity of the electric field. As the voltages of the first and second subpixel electrodes 191a and 191b differ from each other, the liquid crystal molecules 31 placed over the two subpixel electrodes 191a and 191b differ in inclination angle from each other.

Accordingly, the respective regions D1 to D4 of the liquid crystal layer 3 are divided into first subregions D1a, D2a, D3a, and D4a disposed over the first subpixel electrode 191a, and second subregions D1b, D2b, D3b, and D4b disposed over the second subpixel electrode 191b. As shown in FIG. 3, the voltage of the first subpixel electrode 191a is relatively high so that the liquid crystal molecules 31 of the first subregions D1a to D4a are inclined more than those of the second subregions D1b to D4b.

Consequently, the two subpixels PXa and PXb are differentiated in luminance from each other, and the sum of luminance thereof becomes the luminance of the pixel PX as a whole. For this reason, the voltages applied to the two subpixel electrodes 191a and 191b may be so established as to make the luminance of the pixel PX have the target grayscale value. In other words, the voltages applied to the two subpixel electrodes 191a and 191b are diverged from the image signal with respect to one pixel PX.

When the voltages of the first and second subpixel electrodes 191a and 191b are appropriately controlled, the image viewed from the lateral side approximates the image viewed from the frontal side as much as possible, thereby enhancing the lateral visibility.

Another exemplary embodiment of an LCD will now be described in detail with reference to FIG. 4 to FIG. 7.

Figure 4:
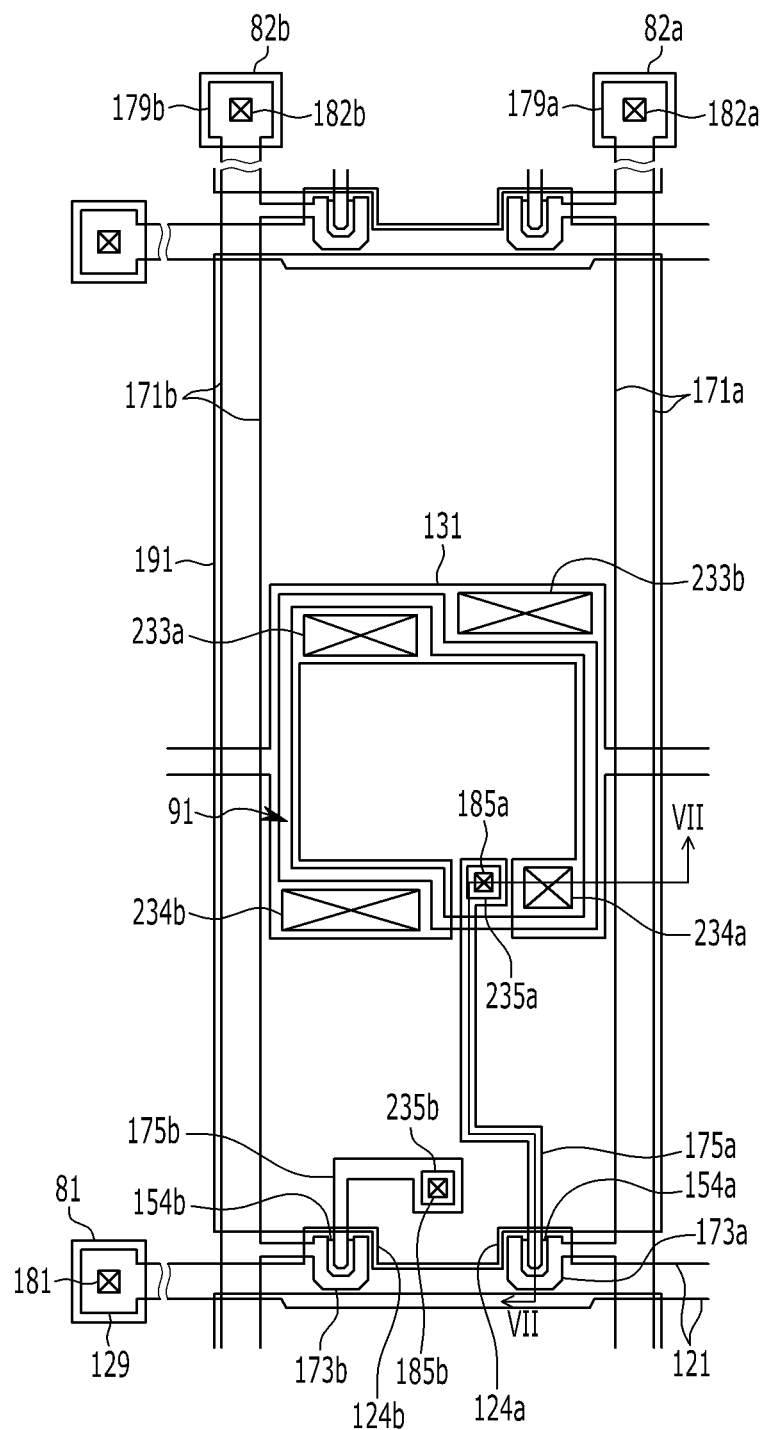
FIG. 4 is a top plan layout view of an exemplary embodiment of an LCD.
Figure 5:
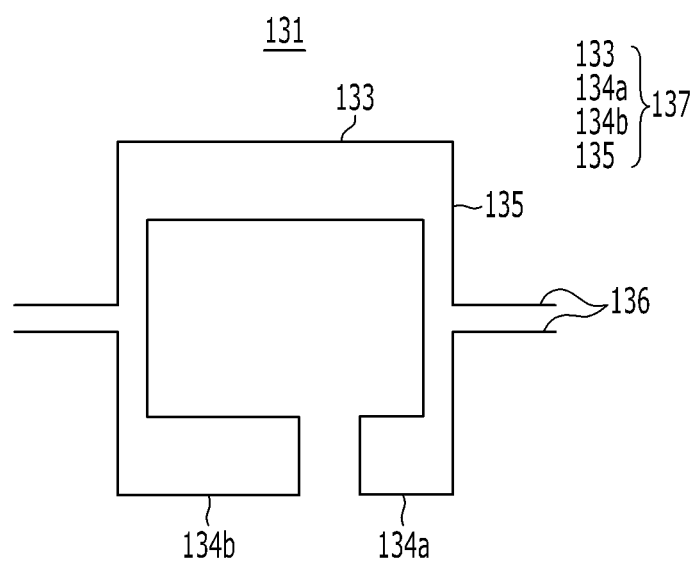
FIG. 5 is a top plan layout view of a storage electrode line of the exemplary embodiment of an LCD shown in FIG. 4.
Figure 6:
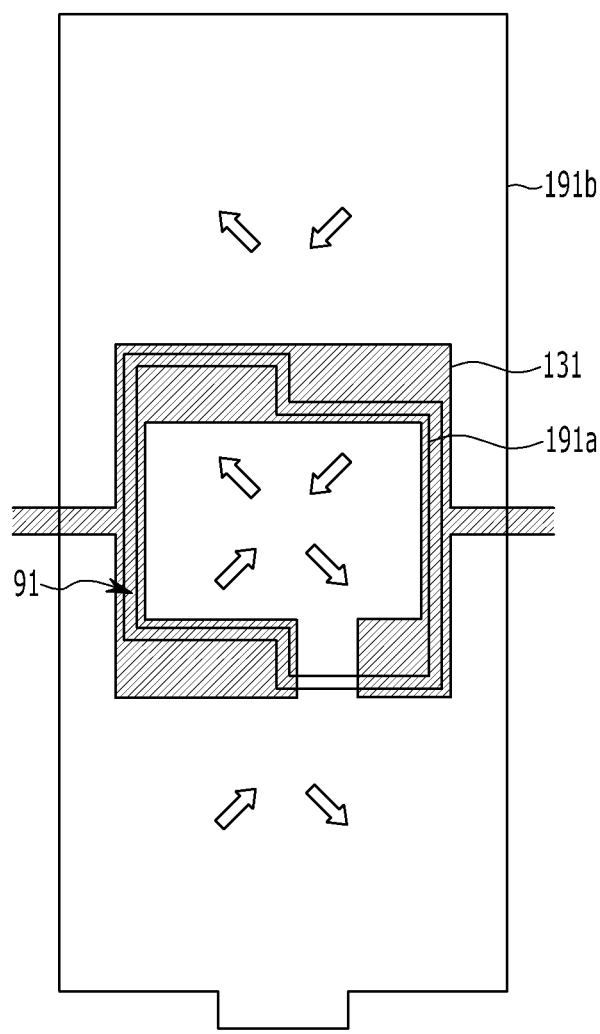
FIG. 6 is a top plan layout view of the exemplary embodiment of an LCD shown in FIG. 4 illustrating the alignment direction of the liquid crystal over a pixel electrode thereof.
Figure 7:
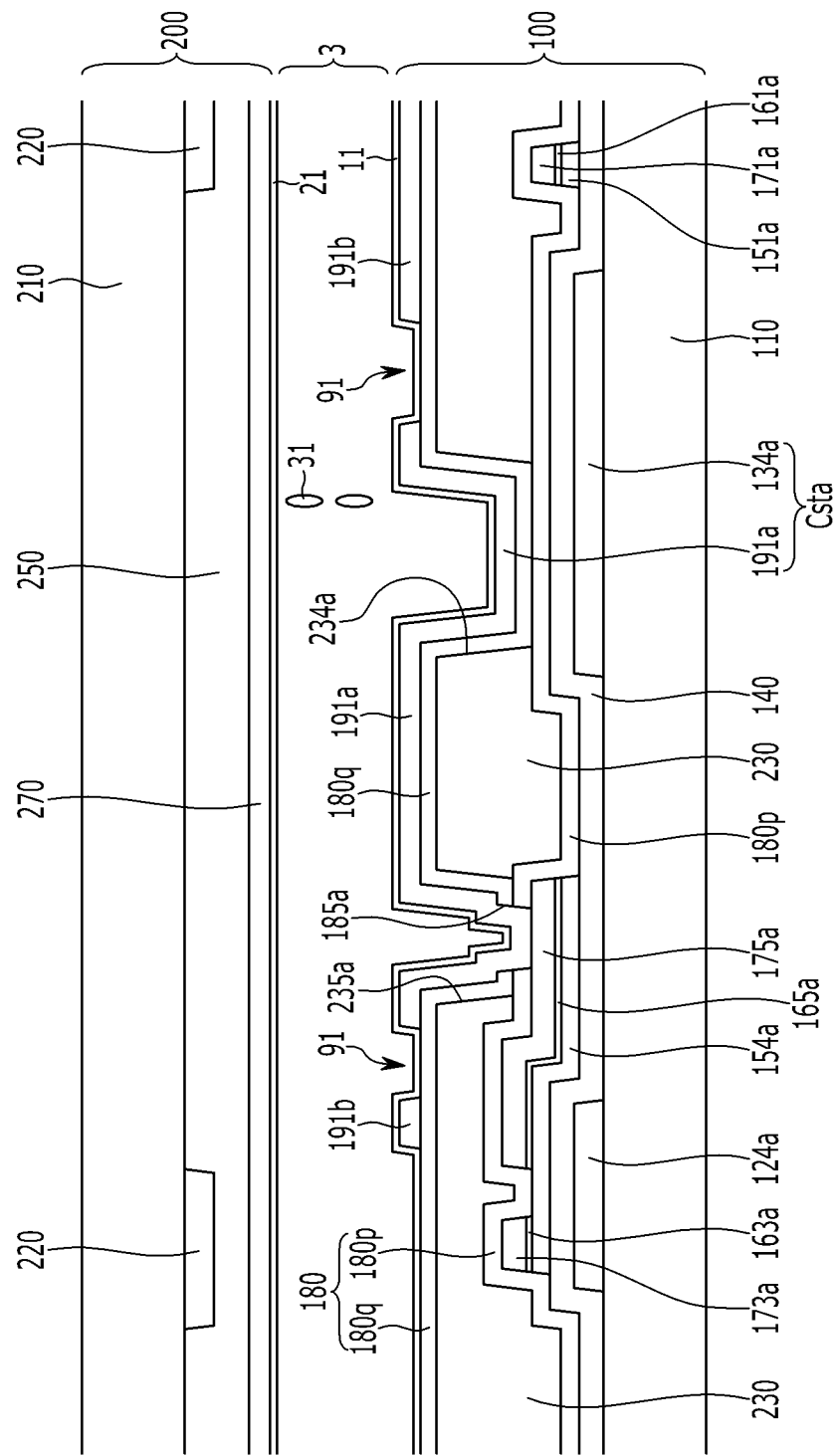
FIG. 7 is a cross-sectional view of the exemplary embodiment of an LCD shown in FIG. 4 taken along line VII-VII.

FIG. 4 is a top plan layout view of an exemplary embodiment of a LCD, and FIG. 5 is a top plan layout view of a storage electrode line of the exemplary embodiment of an LCD shown in FIG. 4. FIG. 6 is a top plan layout view illustrating the alignment directions of liquid crystal molecules of a pixel electrode of the exemplary embodiment of an LCD shown in FIG. 4, and FIG. 7 is a cross-sectional view of the LCD shown in FIG. 4 taken along line VII-VII.

Referring to FIG. 4 to FIG. 7, the exemplary embodiment of an LCD includes a lower display panel, also called a thin film transistor array panel 100, an upper display panel, also called a common electrode panel 200, and a liquid crystal layer 3.

The thin film transistor array panel 100 will be firstly described in detail.

Gate conductors including gate lines 121 and storage electrode lines 131 are formed on an insulation substrate 110.

The gate lines 121 proceed mainly in the horizontal direction, and each includes first and second gate electrodes 124a and 124b protruded vertically and a wide end portion 129.

The storage electrode lines 131 extend mainly in the horizontal direction, and each is interposed between the two gate lines 121.

Referring to FIG. 5, in the present exemplary embodiment, the storage electrode line 131 includes a storage electrode 137 formed in the shape of an opened quadrangular band, and connectors 136 connected thereto. The storage electrode 137 includes horizontal electrode portions 133, 134a, and 134b and vertical electrode portions 135, and the horizontal electrode portions 133, 134a, and 134b of the storage electrode 137 are larger in width than the vertical electrode portions 135 thereof. The horizontal electrode portions 133, 134a, and 134b include an upper electrode portion 133, a right lower electrode portion 134a, and a left lower electrode portion 134b. One end of the upper electrode portion 133 and one end of the right lower electrode portion 134a are connected to each other via one of the vertical electrode portions 135, and the opposite end of the upper electrode portion 133 and one end of the left lower electrode portion 134b are connected to each other via the other vertical electrode portion 135. In the present exemplary embodiment, the opposite ends of the right lower electrode 134a and the left lower electrode 134b are spaced apart from each other at a distance so as to shape an opened quadrangle. The connectors 136 are roughly connected to the centers of the vertical electrode portions 135.

A gate insulating layer 140 is formed on the gate conductors 121 and 131.

First and second semiconductor stripes 151a and 151b are formed on the gate insulating layer 140 (for convenience, reference numeral 151b is omitted in the drawing, but extends under the data line 171b, similar to the semiconductor strip 151a as discussed in detail below). The first and second semiconductor stripes 151a and 151b proceed mainly in the vertical direction, and include first and second protrusions 154a and 154b protruded toward the first and second gate electrodes 124a and 124b.

A first ohmic contact stripe 161a and a first ohmic contact island 165a are formed on the first semiconductor stripe 151a. The first ohmic contact stripe 161a has a protrusion 163a, and the protrusion 163a and the first ohmic contact island 165a face each other over the first protrusion 154a as a pair.

A second ohmic contact stripe (not shown) and a second ohmic contact island (not shown) are formed on the second semiconductor stripe 151b. The second ohmic contact stripe also has a protrusion (not shown), and the protrusion and the second ohmic contact island face each other over the second protrusion 154b as a pair.

A first data line 171a is formed on the first ohmic contact stripe 161a, and a first drain electrode 175a is formed on the first ohmic contact island 165a. A second data line 171b is formed on the second ohmic contact stripe, and a second drain electrode 175b is formed on the second ohmic contact island.

The first and second data lines 171a and 171b proceed mainly in the vertical direction, and cross the gate lines 121 and the connectors 136 of the storage electrode lines 131. The first and second data lines 171a and 171b include first and second source electrodes 173a and 173b extended toward the first and second gate electrodes 124a and 124b, and wide end portions 179a and 179b.

The first and second drain electrodes 175a and 175b each have one end placed over the first and second gate electrodes 124a and 124b while being partially surrounded by the bent portions of the first and second source electrodes 173a and 173b, and extensions extended vertically from each one end thereof, respectively.

In the present exemplary embodiment, the first ohmic contacts 161a and 165a exist only between the underlying first semiconductor 151a and the overlying first data line 171a and first drain electrode 175a so as to lower the contact resistance therebetween. The second ohmic contact exists only between the underlying second semiconductor 151b and the overlying second data line 171b and second drain electrode 175b so as to lower the contact resistance therebetween. The first semiconductor stripe 151a has substantially the same planar shape as the first data line 171a, the first drain electrode 175a, and the first ohmic contacts 161a and 165a. The second semiconductor stripe 151b has substantially the same planar shape as the second data line 171b, the second drain electrode 175b, and the second ohmic contact. However, the semiconductors 151a and 151b have exposed portions not covered by the data lines 171a and 171b and the drain electrodes 175a and 175b, including exposed portions thereof between the source electrodes 173a and 173b and the drain electrode 175a and 175b.

A passivation layer 180 is formed on the first and second data lines 171a and 171b, the first and second drain electrodes 175a and 175b, and the exposed portions of the semiconductors 151a and 154b. The passivation layer 180 includes lower and upper layers 180p and 180q, which in the present exemplary embodiment may include an inorganic insulating material, exemplary embodiments of which include silicon nitride, silicon oxide, and other materials having similar characteristics. Exemplary embodiments include configurations wherein at least one of the lower and upper layers 180p and 180q may be omitted.

The passivation layer 180 has contact holes 182a and 182b exposing the end portions 179a and 179b of the data lines 171a and 171b, and contact holes 185a and 185b exposing the wide end portions of the drain electrodes 175a and 175b. The passivation layer 180 and the gate insulating layer 140 have a plurality of contact holes 181 exposing the end portions 129 of the gate lines 121 in common.

In the present exemplary embodiment, a color filter 230 is formed between the lower and the upper layers 180p and 180q.

The color filter 230 has through holes 235a and 235b corresponding to the contact holes 185a and 185b of the passivation layer 180, and in the present exemplary embodiment the through holes 235a and 235b are larger in size than the contact holes 185a and 185b of the passivation layer 180. The color filter 230 further has a plurality of openings 233a, 233b, 234a, and 234b over the storage electrodes 137. The openings 233a and 233b of the color filter 230 are formed over the upper electrode portion 133, and the openings 234a and 234b of the color filter 230 are formed over the right lower electrode 134a and the left lower electrode 134b, respectively.

Pixel electrodes 191 and a plurality of contact assistants 81, 82a, and 82b are formed on the upper layer 180q of the passivation layer 180.

As shown in FIG. 4, the pixel electrode 191 according to the present exemplary embodiment has substantially the same shape as that shown in FIG. 2. In other words, the pixel electrode 191 includes first and second subpixel electrodes 191a and 191b spaced apart from each other with a gap 91 disposed therebetween.

The gap 91 between the first and second subpixel electrodes 191a and 191b overlaps the storage electrode 137. The storage electrode 137 prevents the leakage of light between the first and second subpixel electrodes 191a and 191b, and simultaneously prevents an unwanted texture that may be generated due to the photo-alignment. The texture induced by the photo-alignment is generated around the gap 91 in the orientation direction of the liquid crystal molecules. In one exemplary embodiment, as shown in FIG. 6, the texture generation may occur at the left upper and right lower portions of the first subpixel electrode 191a, and the right upper and left lower portions of the second subpixel electrode 191b. Accordingly, when the left half of the first subpixel electrode 191a is oriented upward and the right half thereof is oriented downward, the texture-generating regions of the first subpixel electrode 191a linearly coincide with those of the second subpixel electrode 191b. Therefore, the texture-generating regions can be effectively covered only with a simple and small storage electrode 137.

The pixel electrode 191 is also overlapped with the storage electrode 137 so as to form a storage capacitor. In other words, the first subpixel electrode 191a is overlapped with the upper electrode portion 133 and the right lower electrode portion 134a so as to form a storage capacitor Csta, and the second subpixel electrode 191b is overlapped with the upper electrode portion 133 and the left lower electrode 134a so as to form a storage capacitor Cstb. As the pixel electrode 191 and the storage electrode 137 are overlapped with each other with only the passivation layer 180 disposed therebetween in the openings 233a and 234a of the color filter 230, the capacitance of the storage capacitor is increased.

The first and second gate electrodes 124a and 124b, the first and second protrusions 154a and 154b of the first and second semiconductor stripes 151a and 151b, the first and second source electrodes 173a and 173b and the first and second drain electrodes 175a and 175b form first and second TFTs Qa and Qb, and the first and second drain electrodes 175a and 175b are connected to the first and second subpixel electrodes 191a and 191b through the contact holes 185a and 185b.

The contact assistants 81, 82a, and 82b are connected to the end portion 129 of the gate line 121 and the end portions 179a and 179b of the data lines 171a and 179b through the contact holes 181, 182a, and 182b, respectively. The contact assistants 81, 82a, and 82b serve to assist the adhesion of the end portion 129 of the gate line 121 and the end portions 179a and 179b of the data lines 171a and 171b to an external device such as a driver IC, and protect them. Alternative exemplary embodiments include configurations wherein the contact assistants 81, 82a, and 82b may be omitted. In one such alternative exemplary embodiment, the gate lines 121, data lines 171, and storage electrode lines 131 may be connected directly to external driving sources.

The common electrode panel 200 will now be described in detail.

A plurality of light blocking members 220 are formed on an insulation substrate 210, and a planarization layer 250 is formed on the light blocking members 220. A common electrode 270 is formed on the planarization layer 250.

Alignment layers 11 and 21 are formed on the surfaces of the TFT array panel 100 and the common electrode panel 200 facing each other, respectively. Detailed description of the alignment layers 11 and 21 will now be given.

The exemplary embodiments of the alignment layers 11 and 21 will now be described in detail with reference to FIG. 7 to FIG. 9.

Figure 8A:
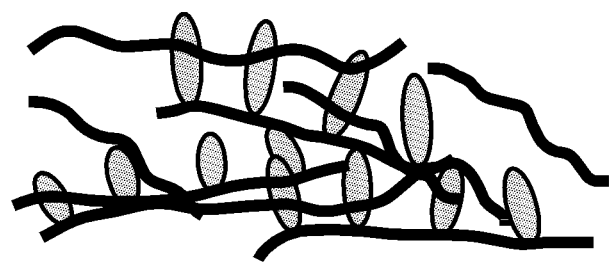
FIGS. 8A and 8B are conceptual cross-sectional views of an exemplary embodiment of an alignment layer in different stages of formation.
Figure 8B:
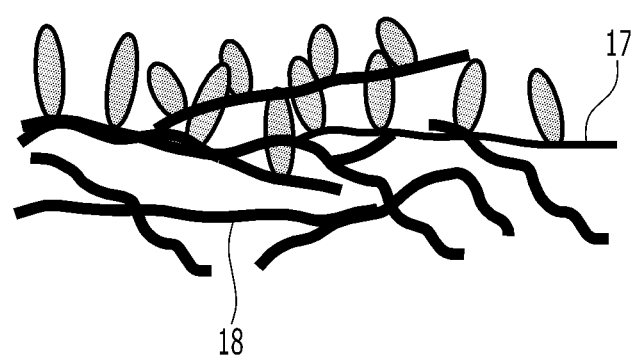
Figure 9:
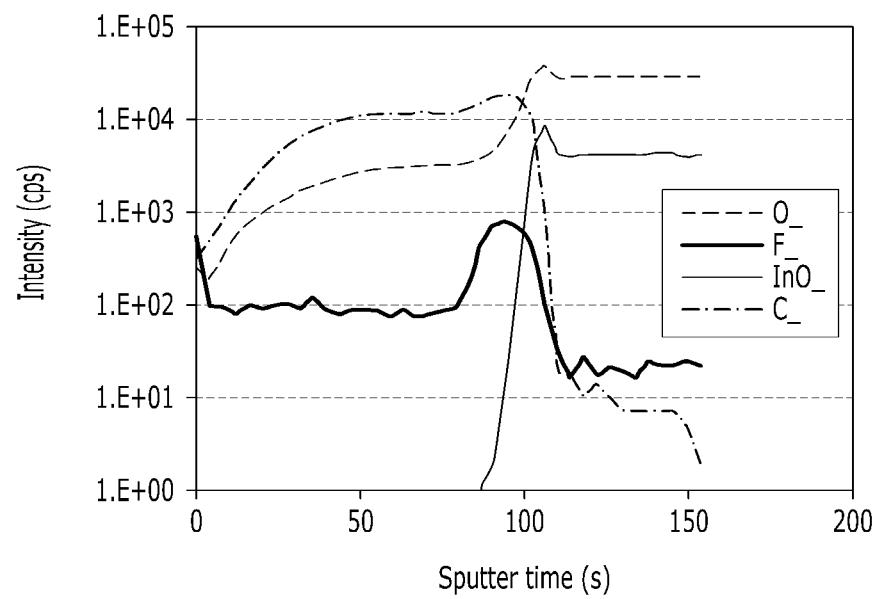
FIG. 9 is a graph of intensity (counts per second, CPS) versus sputter time (seconds, s) illustrating the results of analyzing an exemplary embodiment of an alignment layer by using a time of flight secondary ion mass spectrometry ("TOF-SIMS") technique.

FIGS. 8A and 8B are conceptual cross-sectional views of an exemplary embodiment of an alignment layer in different stages of formation, and FIG. 9 is a graph illustrating results of analyzing an exemplary embodiment of an alignment layer by using a technique of time of flight secondary ion mass spectrometry ("TOF-SIMS").

In the present exemplary embodiment, the alignment layers 11 and 21 include a vertical photo-alignment material 17 and a major alignment material 18. For example, the vertical photo-alignment material 17 includes a first vertical functional group and a photo-reactive group. In an embodiment, the major alignment material 18 does not include the photo-reactive group, and for example, is a commercially-used alignment material for a vertical alignment ("VA") mode liquid crystal display, a twisted nematic ("TN") mode liquid crystal display, an in-plane switching ("IPS") mode liquid crystal display, or a fringe field switching ("FFS") mode liquid crystal display.

The vertical photo-alignment material 17 and the major alignment material 18 may be in a micro-phase separation ("MPS") state. The MPS state is a structure in which a ratio of a molar concentration of the vertical photo-alignment material to a molar concentration of the major alignment material gradually increases in a direction towards the surface of the alignment layer adjacent (e.g., near or proximate) to the liquid crystal layer. The vertical photo-alignment material 17 and the major alignment material 18 are combined and disposed (e.g., coated) on the pixel electrode 191 and the common electrode 270 and hardened (e.g., polymerized), and thereby the micro-phase separation ("MPS") state of the alignment layers 11 and 21 may be provided. When ultraviolet rays are illuminated onto the alignment layers 11 and 21 with the MPS structure, alignment layers 11 and 21 are resultantly formed by way of the reaction of the photo-reactive group. Few side products due to the illumination of ultraviolet rays are made in the alignment layers 11 and 21, and, while not wanting to be bound by theory, it is believed that this results in fewer afterimages in the LCD, thereby improving display quality. Furthermore, because the alignment layers 11 and 21 are formed using ultraviolet illumination and without a separate rubbing process, the production cost may be reduced and the production speed may be increased. The vertical photo-alignment material 17 may be preferentially (e.g., mainly) formed on a surface of the alignment layer closer to the liquid crystal layer 3, and the major alignment material 18 may be preferentially (e.g., mainly) formed on a surface of the alignment layer closer to the substrates 110 and/or 210. Accordingly, in a direction towards the surface of the alignment layers 11 and 21 adjacent to the liquid crystal layer 3, the molar concentration ratio of the vertical photo-alignment material 17 to the major alignment material 18 may increase. A majority (e.g., greater than 50%) of the vertical functional group contained in the vertical photo-alignment material 17 may be present in a region from the surface of the alignment layer to a selected depth. In an embodiment, the position of the vertical functional group in the alignment layer is selected based on the ratio of the molar concentration of the vertical photo-alignment material 17 to the molar concentration of the major alignment material 18. For example, when the ratio of the molar concentration of the major alignment material 18 to the molar concentration of the vertical photo-alignment material 17 is about 5 to about 95, a majority (e.g., greater than 50%) of the vertical functional group may be disposed within a distance corresponding to about 5%, specifically 0.01% to about 5%, more specifically about 0.1% to about 3% of the entire thickness of the alignment layer from the surface of the alignment layer adjacent to the liquid crystal layer 3. When the ratio of the molar concentration of the major alignment material 18 to the molar concentration of the vertical photo-alignment material 17 is about 20:80, a majority (e.g., greater than 50%) of the vertical functional group may be disposed within a distance corresponding to about 20%, specifically 0.1% to about 20%, more specifically about 1% to about 15% of the entire thickness of the alignment layer from the surface of the alignment layer adjacent to the liquid crystal layer 3. When the ratio of the molar concentration of the major alignment material 18 to the molar concentration of the vertical photo-alignment material 17 is about 50:50, a majority (e.g., greater than 50%) of the vertical functional group may be disposed within a distance corresponding to about 50%, specifically 1% to about 50%, more specifically about 5% to about 25% of the entire thickness of the alignment layer from the surface of the alignment layer adjacent to the liquid crystal layer 3.

In an embodiment, the vertical photo-alignment material 17 is a polymer with a weight average molecular weight of about 1000 Daltons to about 1,000,000 Daltons, specifically about 10,000 Daltons to about 900,000 Daltons, more specifically about 20,000 Daltons to about 800,000 Daltons, and is a compound having a main chain bonded with at least one side chain. The side chain may include at least one of a flexible functional group, a thermoplastic functional group, a photo-reactive group, or a vertical functional group, and may further include various other groups having similar characteristics. The main chain may include at least one structural unit derived from a polyimide, polyamic acid, polyamide, polyamicimide, polyester, polyethylene, polyurethane, or polystyrene, and may further include other structural units having similar characteristics. Exemplary embodiments of the main chain may include a cyclic structure, such as an imide group, which are understood to further reinforce the rigidity of the main chain and/or improve electrical characteristics thereof. Accordingly, spots generated when the LCD is operated for a long period of time may be reduced, and stability with respect to the pre-tilt of the alignment layer may be reinforced. Furthermore, in the exemplary embodiment wherein the main chain contains an imide group at a concentration of about 40 mol % to about 75 mol %, the reliability may be further improved, and the printing characteristics and the solubility may be further improved. In the present exemplary embodiment, the pre-tilt angle of the liquid crystal material by the alignment layer is about 90 degrees to about 100 degrees.

The vertical photo-alignment material 17 may be formed by polymerizing a monomer, such as a diamine and acid anhydride. In an embodiment, the diamine monomer includes a side chain to which a flexible functional group, a photo-reactive group, a vertical functional group, or the like are coupled. For example, the diamine and the acid anhydride may be combined (e.g., reacted at) a mole ratio of about 50 mol %:about 50 mol %, and thereby the polyimide group polymer or the polyamic acid group polymer may be polymerized. Also, at least one type of diamine may be used for the polymerization reaction, and at least one type of acid anhydride may be used for the polymerization reaction. In other words, the vertical photo-alignment material 17 may be a homopolymer or a copolymer. When the vertical photo-alignment material 17 is a homopolymer, the imidization ratio of the vertical photo-alignment material 17 may be more than about 75 mol %, and when the vertical photo-alignment material 17 is a copolymer, the imidization ratio of the vertical photo-alignment material 17 may be in the range of about 40 mol % to about 70 mol %, specifically about 45 mol % to about 65 mol %, more specifically about 50 mol % to about 60 mol %.

For example, the diamine may be a photo-reactive diamine, a vertical diamine, or a normal diamine. At least one diamine among a photo-reactive diamine, a vertical diamine, and a normal diamine may be used in the polymerization reaction of the vertical photo-alignment material 17. Also, at least one type of photo-reactive diamine, at least one type of vertical diamine, and at least one type normal diamine may be used in the polymerization reaction of the vertical photo-alignment material 17.

The vertical alignment property and the alignment stability may be improved by controlling the composition ratio of the copolymer of the photo-reactive diamine, the vertical diamine, and the normal diamine. For example, the photo-reactive diamine may be used in a range of about 40 mol % to about 70 mol %, specifically about 45 mol % to about 65 mol %, more specifically about 50 mol % to about 60 mol %, the vertical diamine may be used in a range of about 10 mol % to about 40 mol %, specifically about 15 mol % to about 35 mol %, more specifically about 20 mol % to about 30 mol %, and the normal diamine may be used in a range of about 0 mol % to about 20 mol %, specifically about 1 mol % to about 18 mol %, more specifically about 2 mol % to about 16 mol %. In detail, the photo-reactive diamine amount may be included in an amount of about 60 mol %, the vertical diamine amount may be included in an amount of about 30 mol %, and the normal diamine amount may be included in an amount of about 10 mol %, but they are not limited thereto. Also, to form the alignment layer by using the photo-reactive group in a minimum amount, throughout the mixture of the vertical photo-alignment material 17 and the major alignment material 18, the photo-reactive group may be disposed at the center or under the alignment layer, or the optimized photo-reactive group may be disposed on the alignment layer. Also, to improve the stability of the alignment layer, at least one of the vertical diamine and the normal diamine may be copolymerized and thus included in the vertical photo-alignment material.

The photo-reactive diamine includes a first diamine group, a first flexible functional group, a photo-reactive group, and a first vertical functional group. The vertical diamine group includes a first diamine group, a first flexible functional group, and a second vertical functional group, and does not include the photo-reactive group. The normal diamine group includes a third diamine group, and does not include the photo-reactive group or the vertical functional group.

For example, in the photo-reactive diamine, the first flexible functional group may be coupled to the first diamine group, the photo-reactive group may be coupled to the first flexible functional group, and/or the first vertical functional group may be coupled to the photo-reactive group. In the vertical diamine, the second flexible functional group may be coupled to the second diamine group, and the second vertical functional group may be coupled to the second flexible functional group.

The first, second, and third diamine groups may each independently be represented by Formula 1 to Formula 9 below, however it is not limited thereto.

Formula 1

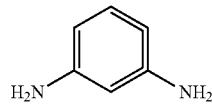

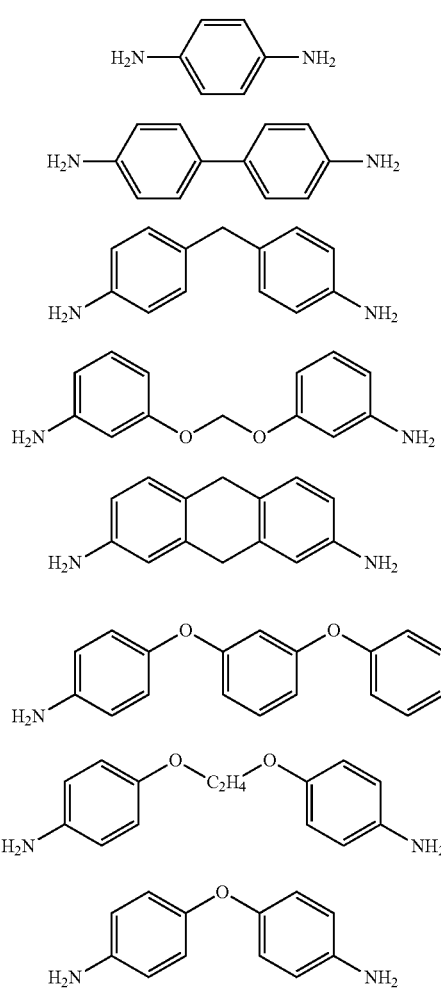

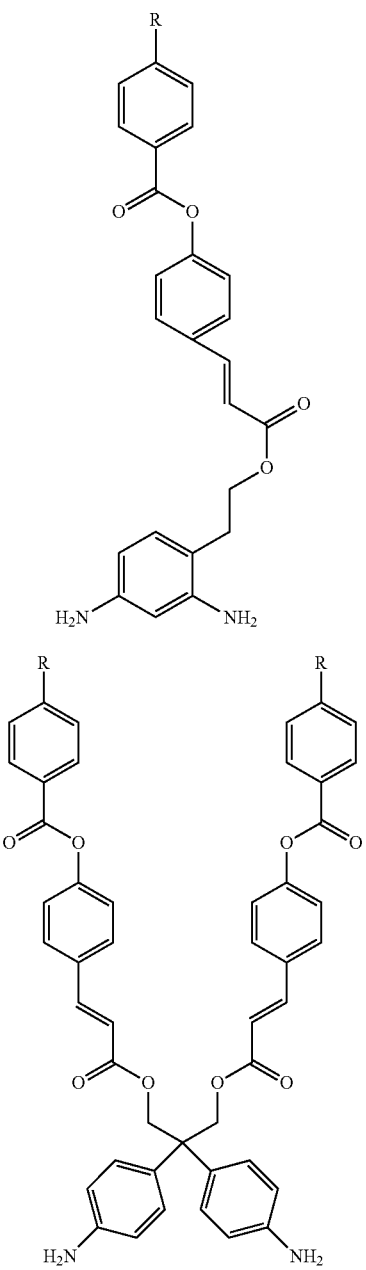

thereto. In an embodiment, at least one of the aryl group or the cyclohexyl group may be coupled directly or through a C1-C5 alkylene.

The photo-reactive diamine may be represented by Formula 10 or Formula 11 below, however it is not limited thereto.

The first and second flexible functional groups or the thermoplastic functional group is a functional group which may make the side chain bonded to the main chain easily aligned.

For example, the flexible functional group and/or the thermoplastic functional group may include at least one of —O—, —OCO—, —C(O)O—, —OR— (wherein R is H or a C1-C5 alkylene group), —R— (wherein R is a C1-C5 alkylene group), or an imide group, however it is not limited thereto. Also, the flexible functional group or the thermoplastic functional group may contain a substituted or unsubstituted alkylene or C3-C20 alkoxy group.

The photo-reactive group is a functional group that directly causes a photo-dimerization reaction or a photo-isomerization reaction when illuminated with ultraviolet rays.

For example, the photo-reactive group may contain at least one of an azo compound, a cinnamate compound, a chalcone compound, a coumarin compound, or a maleimide compound, but is not limited thereto.

The vertical functional group is a functional group that moves the whole side chain in the direction substantially vertical to the main chain, which may stand parallel to the substrates 110 and 210.

For example, the vertical functional group may contain at least one of a C1-C25 alkyl or alkoxy group-substituted aryl group, or a C1 to C25 alkyl or alkoxy group-substituted cyclohexyl group, or a steroid group, but it is not limited In Formulas 10 and 11, R is H, a substituted or unsubstituted $C_1$-$C_{12}$ alkyl group, a substituted or unsubstituted $C_2$-$C_{12}$ alkenyl group, or a substituted or unsubstituted $C_6$-$C_{18}$ aryl group. Also, in Formula 10 and Formula 11, at least one —$CH_2$— may be substituted by —O— or —Si—, and at least one hydrogen atom may be substituted by F or Cl.

For example, the acid anhydride may be represented by Formula 12 to Formula 18 below, however it is not limited thereto.

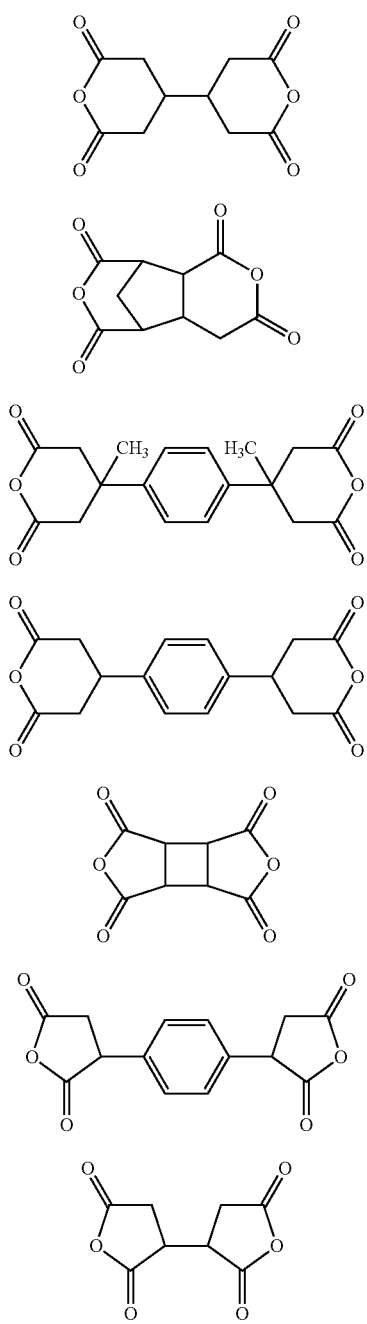

Formula 12

Formula 13

Formula 14

Formula 15

Formula 16

Formula 17

Formula 18

At least one vertical photo-alignment material 17 and at least one major alignment material 18 may be coupled by a cross-linking agent. When forming the alignment layers 11 and 21 using the cross-linking agent, the electrical characteristics and the chemical stability of the alignment layers 11 and 21 may be improved. Furthermore, when the cross-linking agent is contained in an amount of less than about 30 weight percent (wt %), based on the total weight of the alignment layer, the electrical characteristic and the chemical stability of the alignment layers 11 and 21 may be further improved.

For example, the cross-linking agent may include a compound represented by Formula 19 to Formula 21 below, however it is not limited thereto.

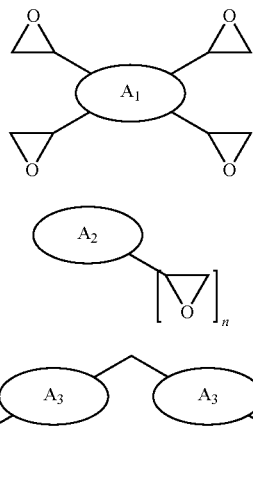

Formula 19

Formula 20

Formula 21

In Formula 19 to 21, $A_1$-$A_4$ are each independently a substituted or unsubstituted $C_6$-$C_{24}$ aryl group or a substituted or unsubstituted $C_3$-$C_{24}$ cycloalkyl group, and n is 1 to 6.

A method of forming the vertical photo-alignment material 17 includes a method in which the compound that is coupled with the thermoplastic functional group, the photo-reactive group, and the vertical functional group is added to the above-disclosed polyimide, polyamic acid, polyamide, polyamicimide, polyester, polyethylene, polyurethane, or polystyrene. In an embodiment, the thermoplastic functional group is directly coupled to the polymer main chain, and the side chain may include the thermoplastic functional group, the photo-reactive group, and the vertical functional group.

The major alignment material 18 does not contain the photo-reactive group and may contain the above-identified polymer main chain, and the weight average molecular weight thereof is about 10,000 to 1,000,000 Daltons specifically about 10,000 Daltons to about 900,000 Daltons, more specifically about 20,000 Daltons to about 800,000 Daltons. For example, the diamine and the acid anhydride are reacted at about 50 mol %:about 50 mol % such that the polyimide group polymer or the polyamic acid group may be polymerized. Also, at least one diamine may be used in the polymerization reaction, and at least one acid anhydride may be used in the polymerization reaction. In other words, the major alignment material 18 may be a homopolymer or a copolymer. For example, at least one fourth diamine group may be used in the polymerization reaction of the major alignment material 18, wherein the fourth diamine may be as disclosed above for the first, second, and third diamine groups. Also, at least one kind of vertical diamine and at least one kind of normal diamine may be used in the polymerization reaction of the major alignment material 18.

When the major alignment material 18 includes the imide group at about 50 mol % to about 80 mol % concentration, the afterimages and spots of the liquid crystal display may be further reduced, and the printing characteristics and the solubility may be further improved.

Figure 12:
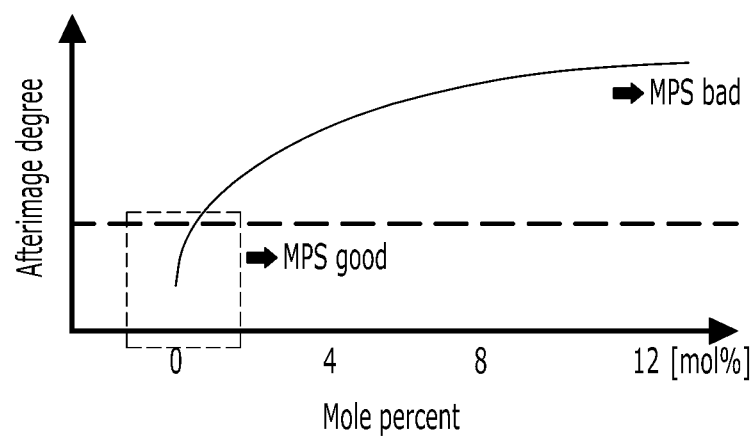
FIG. 12 is a graph of after image degree versus mole percent illustrating the afterimage degree of an exemplary embodiment of an LCD with an exemplary embodiment of an alignment layer.

The major alignment material 18 may contain a vertical functional group as a side chain bonded to the polymer main chain at a concentration of about 5 mol %, specifically about 1 mol % to about 10 mol %, more specifically about 2 mol % to about 8 mol %. Here, the vertical functional group may be derived from the vertical diamine. FIG. 12 is a graph illustrating the degree of afterimages in an exemplary embodiment of an LCD as a function of the content in mol % of the vertical functional group contained in the major alignment material 18. As shown in FIG. 12, when the major alignment material 18 contains the vertical functional group at a concentration of about 5 mol % or less, the micro-phase separation ("MPS") state may be clearer, and afterimages of the LCD may be drastically, or exponentially, reduced. Furthermore, when the major alignment material 18 contains the vertical functional group at a concentration of about 2 mol % or less, specifically about 0.1 mol % to about 2 mol %, more specifically about 0.5 mol % to about 1.5 mol %, the afterimages of the LCD may be even further reduced.

For example, the vertical photo-alignment material 17 may be a polyamic acid compound represented by Formula 22 below, or a polyimide compound represented by Formula 23 below. The polyimide may be formed by imidizing the polyamic acid. Furthermore, in an embodiment, the reliability of the vertical photo-alignment material 17 including the polyimide compound may be better than the material including the polyamic acid compound.

Formula 22

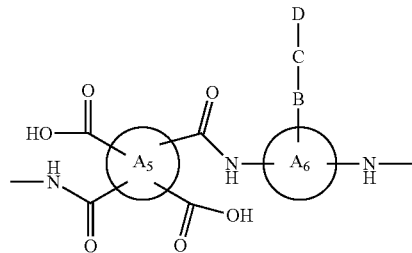

Formula 23

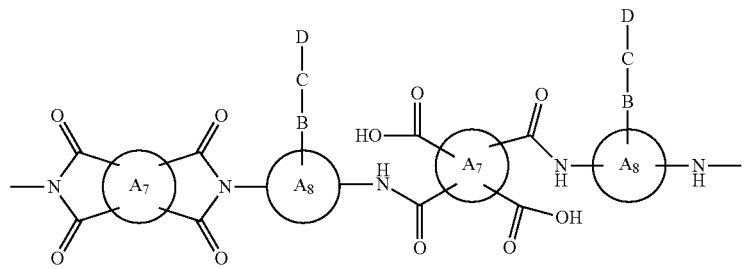

In Formula 22 and Formula 23, $A_5$-$A_8$ are each independently the substituted or unsubstituted $C_6$-$C_{24}$ aryl group or the substituted or unsubstituted $C_3$-$C_{24}$ cycloalkyl group, B is the flexible group, C is the photo-reactive group, and D is the vertical functional group.

Also, the major alignment material 18 may be the polyamic acid compound represented by Formula 24 below, or the polyimide compound represented by Formula 24 below. The polyimide may be formed by imidizing the polyamic acid. Furthermore, in the micro-phase separation ("MPS") state, the major photo-alignment material 18 may be an important factor with regard to the content of the vertical diamine and the imidization ratio.

Formula 24

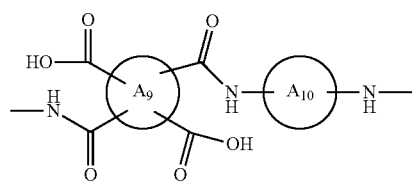

Formula 25

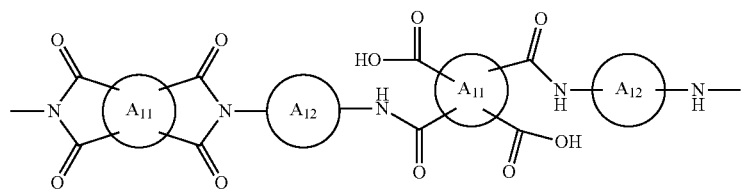

In Formula 24 and Formula 25, $A_9$-$A_{12}$ are each independently a substituted or unsubstituted $C_6$-$C_{24}$ aryl group or a substituted or unsubstituted $C_3$-$C_{24}$ cycloalkyl group.

The compound represented by Formula 22 to 25 may be included with (e.g. mixed with) at least one of vertical photo-alignment material 17 and at least one of the major alignment material 18. Furthermore, when the compound represented by Formula 23 and the compound represented by Formula 24 are included (e.g., mixed), or the compound represented by Formula 23 and the compound represented by Formula 25 are included (e.g., mixed), the reliability of the alignment layers 11 and 21 may be improved, and the afterimages and the spots may be further reduced.

A weight ratio at which the vertical photo-alignment material 17 and the major alignment material 18 are mixed may be in the range of about 5:95 to about 95:5, specifically 10:90 to about 90:10, more specifically 15:85 to about 85:15. When the mixture weight ratio is about 5:95 to about 50:50, the reliability may be improved, and when the mixture weight ratio is about 10:90 to about 40:60, the reliability may be further improved. For example, when the vertical photo-alignment material 17 is included in an amount of less than about 50 wt %, a voltage holding rate ("VHR") is increased such that the afterimages of the liquid crystal display may be reduced. When the vertical photo-alignment material 17 is included in an amount of more than about 5 wt %, the pre-tilt uniformity is maintained such that the afterimage of the liquid crystal display may be reduced. For example, when the weight ratio of the vertical photo-alignment material 17 and the major alignment material 18 is about 10:90 to about 40:60, and the vertical photo-alignment material 17 includes the photo-reactive diamine at about 40 mol % to about 70 mol %, the vertical diamine at about 10 mol % to about 40 mol %, and the normal diamine at about 0 mol % to about 20 mol %, the alignment layers 11 and 21 may include the photo-reactive diamine at about 4 mol % to about 28 mol %, the vertical diamine at about 60 mol % to about 92 mol %, and the normal diamine at about 60 mol % to about 92 mol %.

Figure 11:
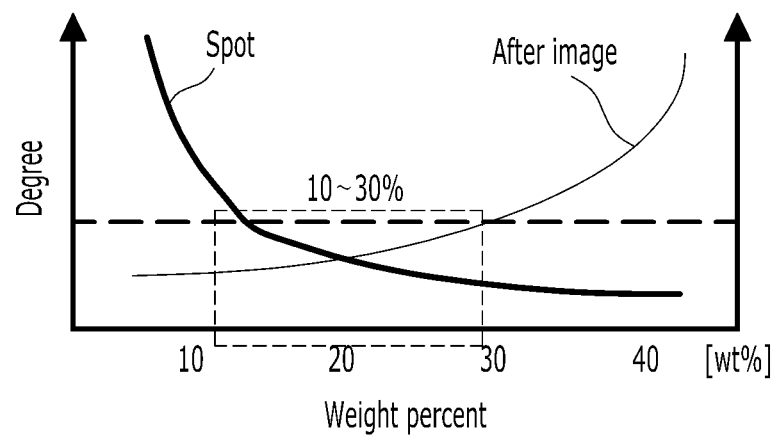
FIG. 11 is a graph of degree versus weight percent illustrating spot and afterimage degrees of an exemplary embodiment of an LCD with an exemplary embodiment of an alignment layer.

FIG. 11 is a graph illustrating the degree of afterimage and spots as a function of the weight percent (wt %) of the vertical photo-alignment material 17. The results shown in the graph show that when the content of the vertical photo-alignment material 17 in the combination is about 10 wt % to about 40 wt %, the afterimage and spots of the LCD may be further reduced. Furthermore, as the content of the vertical photo-alignment material 17 in the combination is reduced, the content of the photo-reactive group may be reduced and fewer undesirable byproducts may be generated. Consequently, the afterimages of the LCD may be reduced and the reaction efficiency may increase. As the content of the vertical photo-alignment material 17 in the mixture decreases, the production cost may be also reduced.

Also, when the alignment layers 11 and 21 both including the vertical photo-alignment material 17 and the major alignment material 18 includes the photo-reactive diamine group at about 4 mol % to about 28 mol %, the vertical diamine group at about 1 mol % to about 16 mol %, and the normal diamine group at about 60 mol % to about 92 mol %, the reliability and the processing efficiency of the alignment layers 11 and 21 may be improved. Furthermore, the alignment layers 11 and 21 may each independently include the photo-reactive diamine group at about 7 mol % to about 28 mol %, the vertical diamine group at about 3 mol % to about 12 mol %, and the normal diamine group at about 60 mol % to about 90 mol %, and in this case, the reliability and the processing efficiency of the alignment layers 11 and 21 may be further improved.

In the present exemplary embodiment, the vertical photo-alignment material 17 and the major alignment material 18 each have surface tension of about 25 dyn/cm to about 65 dyn/cm, respectively. Because the surface tension of the vertical photo-alignment material 17 in the present exemplary embodiment may be equal to or less than that of the major alignment material 18, and thus, the MPS structure may become clearer.

The graph shown in FIG. 9 is produced using time-of-flight secondary-ion mass spectrometry (TOF-SIMS), and the material composition of the target alignment layer is shown as discussed below.

In the present exemplary embodiment, the vertical photo-alignment material 17 was formed by polymerizing diamine with acid dianhydride. The diamine contains two side chains, each side chain including fluorine (F), an aryl group, and cinnamate. In this embodiment, the content of the vertical photo-alignment material 17 was about 20 wt %. In the present exemplary embodiment, the fluorine (F) content is an indicator for detecting the vertical photo-alignment material 17. Polyimide with no content of vertical functional group was used as the major alignment material 18 at an amount of about 80 wt %. An indium tin oxide ("ITO") thin film was formed on a substrate, and a mixture of the vertical photo-alignment material 17 and the major alignment material 18 was printed on the ITO thin film. After the printed mixture was hardened, linearly polarized ultraviolet rays were illuminated thereto to thereby form an alignment layer with a thickness of about 1000 angstroms.

As illustrated in FIG. 9, the intensity of the fluorine (F) content in the vertical functional group was radically reduced in a very short period of time, and it was found from the measurement that the fluorine (F) content was no longer found above at a depth of the alignment layer greater than 91 angstroms from the surface thereof. Accordingly, because the vertical photo-alignment material 17 was formed up to about 9% from the surface and the major alignment material 18 was formed under the vertical photo-alignment material 17, the MPS structure was clearly formed. Furthermore, an LCD with the alignment layers was driven, and it was shown that few linear afterimages and surface afterimages existed.

Figure 10:
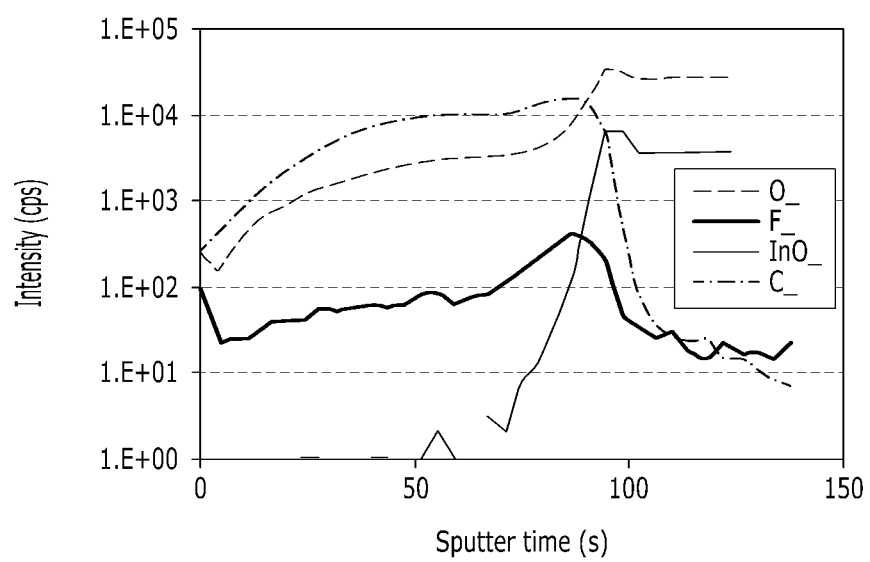
FIG. 10 is a graph of intensity (counts per second, CPS) versus sputter time (seconds, s) illustrating the results of analyzing an exemplary embodiment of an alignment layer by using a TOF-SIMS technique.

FIG. 10 is a graph illustrating the results of analyzing an exemplary embodiment of an alignment layer using TOF-SIMS. The material composition of the target alignment layer was the same as that related to FIG. 7 except that the content of the vertical photo-alignment material 17 was about 10 wt % and the content of the major alignment material 18 was about 90 wt %, based on the total weight of the alignment layer. In an exemplary embodiment, the fluorine is not present in the alignment layer at a depth greater than about 42 angstroms from the surface thereof, and very few linear afterimages and surface afterimages are present.

Next, the disclosed embodiments are further described in an exemplary embodiment, however the below exemplary embodiment is only an exemplary embodiment and the present invention is not limited thereto.

Exemplary Embodiment 1

The photo-reactive diamine represented by Formula 26 in an amount of 70 mol %, the vertical diamine represented by Formula 27 in an amount of 30 mol %, and the acid anhydride represented by Formula 13 in an amount of 100 mol %, based on the vertical photo-alignment material are polymerized to synthesize the vertical photo-alignment material at an imidization ratio of 50%. The normal diamine represented by Formula 1 in an amount of 30 mol %, the normal diamine represented by Formula 2 in an amount of 70 mol %, and the acid anhydride represented by Formula 13 in an amount of 100 mol % are polymerized to synthesize the vertical photo-alignment material at an imidization ratio of 50%.

For an organic solvent including 30 wt % N-methylpyrrolidone, 20 wt % gamma-butyrolactone, and 50 wt % butyl cellosolve, based on the total weight of the solvent, were mixed with 6.5 wt % of the vertical photo-alignment material and the major alignment material, based on the total weight of the organic solvent to manufacture an alignment layer manufacturing composition. The weight ratio of the vertical photo-alignment material to the major alignment material is 20:80.

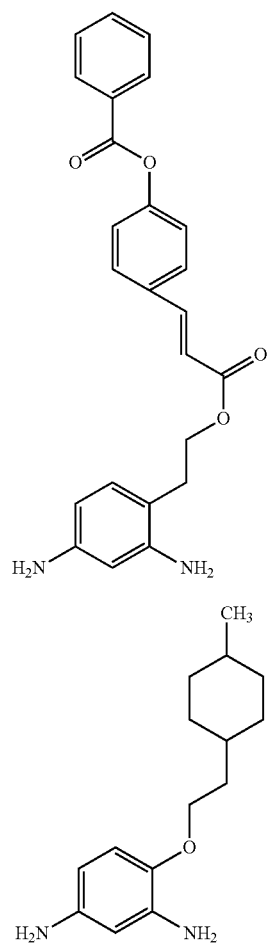

The alignment layer manufacturing composition is coated on a 17 inch display substrate, is prebaked at a temperature of about 72° C., and is hardened at a temperature of about 220° C. for about 20 minutes. Next, ultraviolet rays polarized in an ultraviolet ray light exposer are irradiated at about 20 mJ/cm$^2$, and a vertical alignment ("VA") mode liquid crystal is inserted to manufacture a liquid crystal panel.

Exemplary Embodiment 2

The liquid crystal panel is manufactured with the same method as that of Exemplary Embodiment 1, except for synthesizing the vertical photo-alignment material at an imidization ratio 50% by polymerizing the photo-reactive diamine represented by Formula 26 in an amount of 100 mol % and the acid anhydride represented by Formula 13 in an amount of 100 mol %.

Characteristic Estimation of Alignment Layer

In the liquid crystal panel of Exemplary Embodiment 1, the liquid crystal has the pretilt of about 88.1 degrees, and the liquid crystal panel displays a suitable image without spots. After a checker plug pattern is driven and parked after 24 hours at an angle of about 50 degrees, afterimage estimation by applying a gray display pattern is executed, and as an estimation result, the surface afterimage appears at about 4 degrees, and the surface afterimage is improved compared with Exemplary Embodiment 2. The remaining DC voltage ("RDC") appears as −21 mV, and the DC afterimages are improved compared with Exemplary Embodiment 2.

In the liquid crystal panel of Exemplary Embodiment 2, the liquid crystal has a pretilt of about 87.6 degrees, and the liquid crystal panel displays a good image without spots. After a checker plug pattern is driven and parked after 24 hours with an angle of about 50 degrees, afterimage estimation by applying the gray display pattern is executed, and as an estimation result, the surface afterimage appears at about 6 degrees. The remaining DC voltage ("RDC") appears as about −150 mV.

An exemplary embodiment of a method of manufacturing an exemplary embodiment of an LCD will now be described in further detail. Redundant description will be omitted.

TFTs including gate electrodes 124*a* and 124*b*, source electrodes 173*a* and 173*b*, drain electrodes 175*a* and 175*b* and semiconductors 154*a* and 154*b* are formed on a substrate 110. Lower and upper layers 180*p* and 180*q* are formed on the thin film transistors. A color filter 230 is formed between the lower and the upper layers 180*p* and 180*q*. Pixel electrodes 191*a* and 191*b* and contact assistants 81 and 82 are formed on the upper layer 180*q*.

A mixture of a vertical photo-alignment material 17 and a major alignment material 18 is printed onto the pixel electrodes 191*a* and 191*b* and the contact assistants 81 and 82. In one exemplary embodiment, the photo-alignment material 17 and major alignment material 18 may be printed via inkjet printing, and subsequently hardened. In one exemplary embodiment, the hardening may be performed in two steps. According to one exemplary embodiment, the mixture is pre-baked at about 70-80° C. for about 2 to about 3 minutes to thereby remove a solvent therefrom, and is hardened at about 210° C. or more for about 10 to about 20 minutes to thereby form a MPS structure. At this time, the vertical photo-alignment material 17 is formed at the upper side area, and the major alignment material 18 is formed at the lower side area.

Thereafter, ultraviolet rays are illuminated onto the substrate 110. Exemplary embodiments include configurations wherein the ultraviolet rays are oriented in a vertical or inclined direction with respect to the substrate 110. According to the present exemplary embodiment, the rubbing process to form the alignment layer 11 can be omitted, the production speed is increased and the production cost is reduced. Furthermore, the direction of illuminating ultraviolet rays may be altered using a mask so that multiple domains that are differentiated in pre-tilt direction may be formed. In one exemplary embodiment, the ultraviolet rays may be partially polarized ultraviolet rays or linearly polarized ultraviolet rays. In one exemplary embodiment, the wavelength of the ultraviolet rays may be about 270 nm to about 360 nm, and the energy thereof may be about 10 mJ to about 5000 mJ.

Subsequently, a liquid crystal layer 3 is formed on the alignment layer 11 or the alignment layer 21.

A light blocking member 220, an overcoat 250, and a common electrode 270 are sequentially formed on a substrate 210. An alignment layer 21 is formed on the common electrode 270 in substantially the same way as that of the formation of the alignment layer 11.

The substrate 210 is disposed such that the alignment layer 21 formed on the substrate 210 contacts the liquid crystal layer 3, and the two substrates 110 and 210 are combined with each other.

However, in the alternative exemplary embodiment wherein the liquid crystal layer 3 is formed on the alignment layer 21 of the substrate 210, the substrate 210 is disposed such that the alignment layer 11 formed on the substrate 110 contacts the liquid crystal layer 3, and the two substrates 110 and 210 are combined with each other.

A common thin film deposition or photolithography patterning method may be used in order to form TFTs and electrodes.

Figure 13:
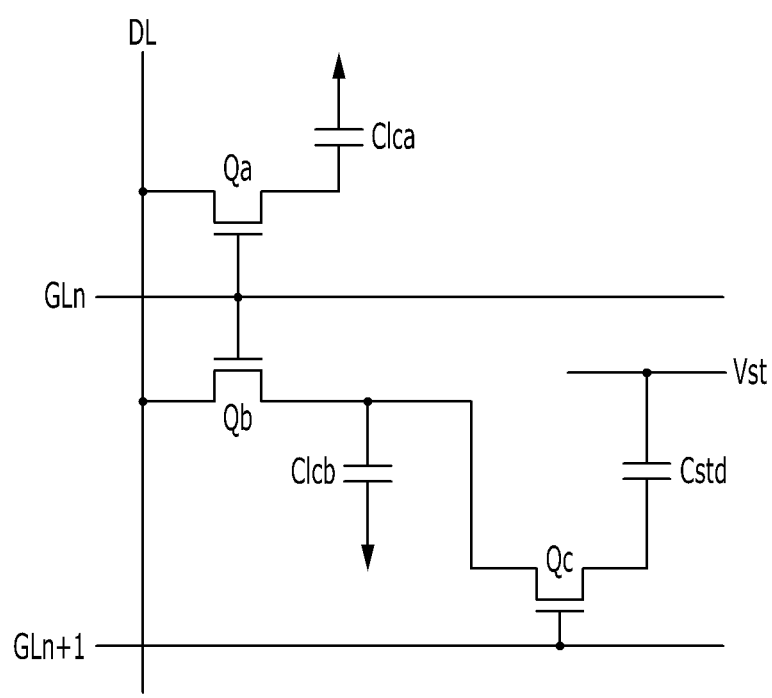
FIG. 13 is an equivalent circuit diagram of an exemplary embodiment of a pixel in a liquid crystal display.
Figure 14:
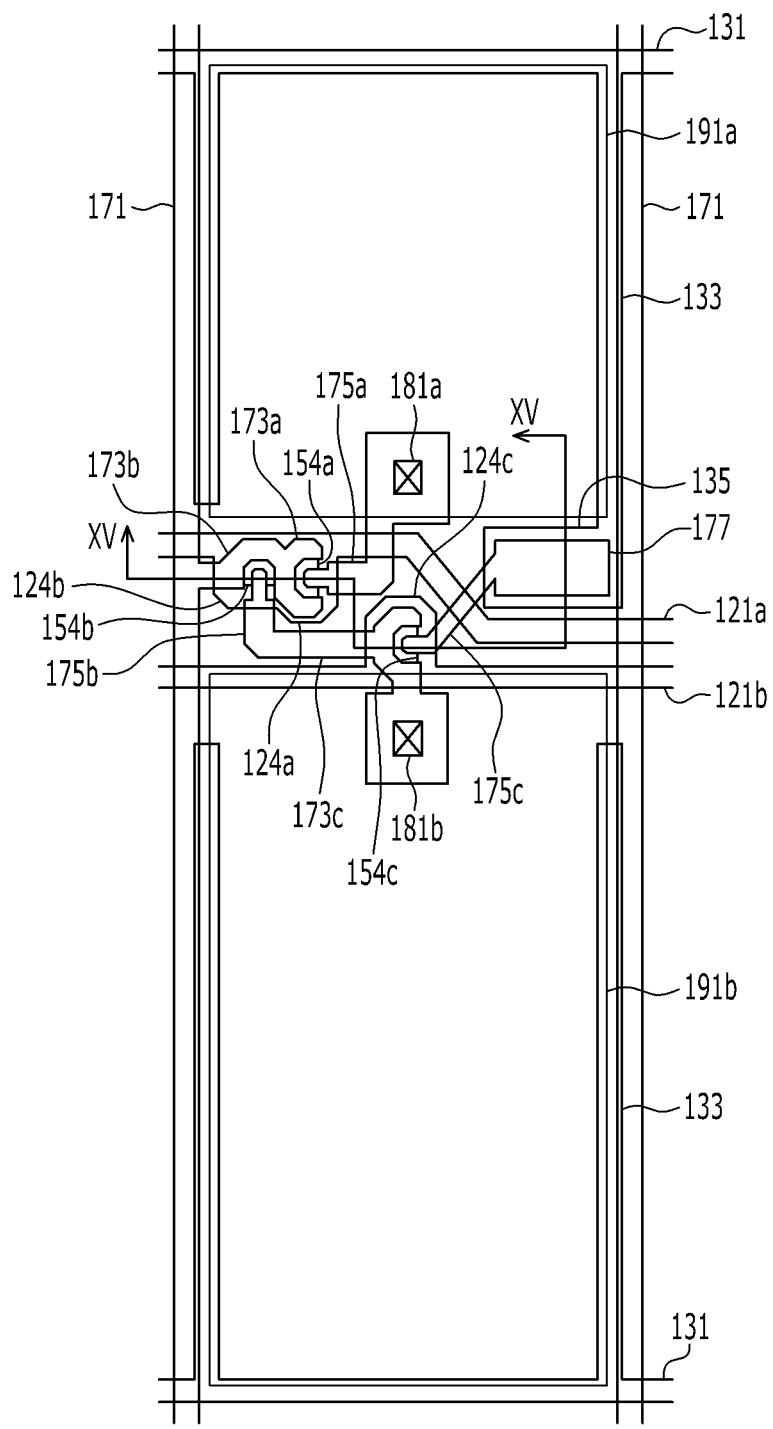
FIG. 14 is a layout view of an exemplary embodiment of a liquid crystal display.
Figure 15:
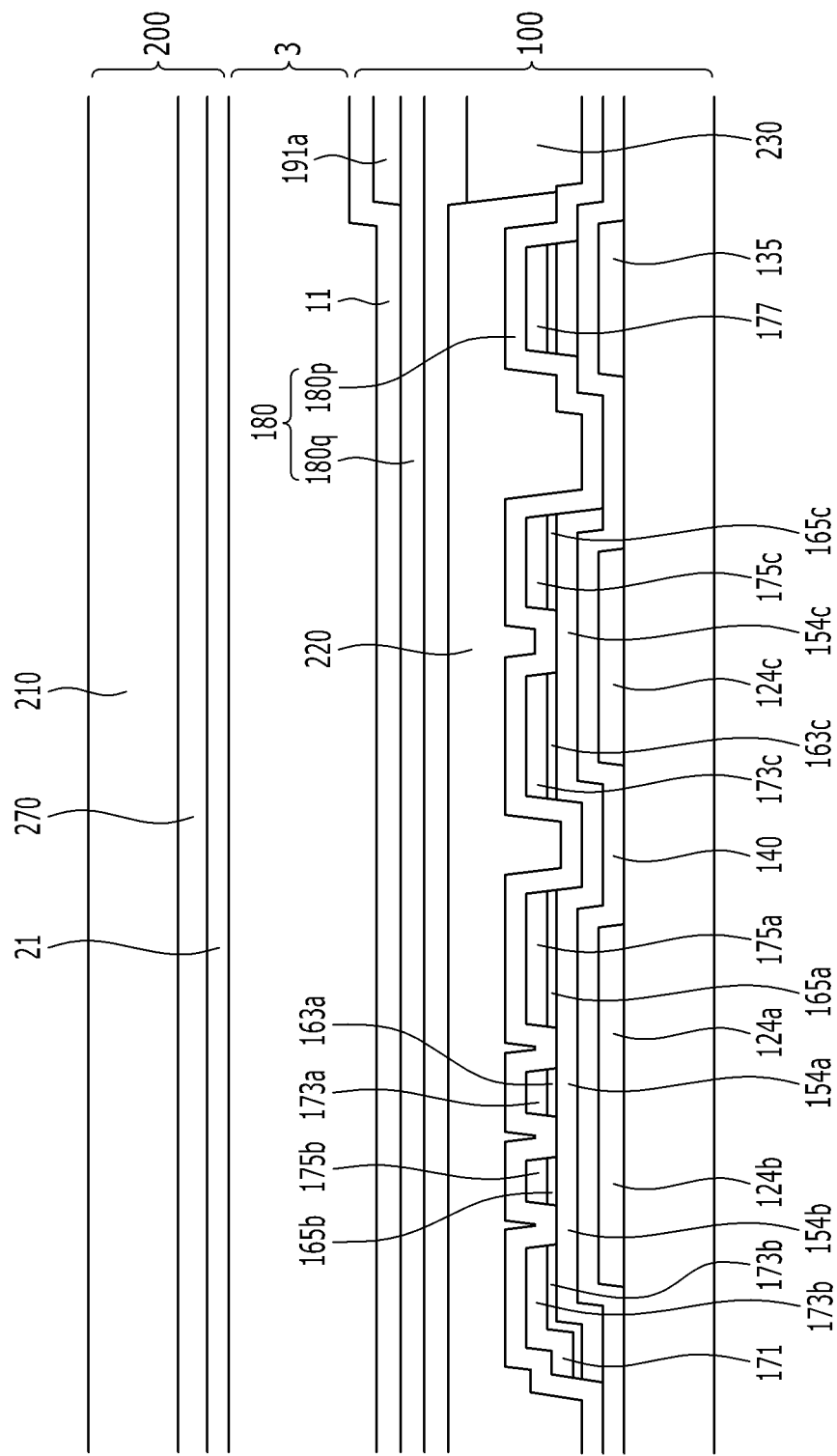
FIG. 15 is a cross-sectional view of the liquid crystal display of FIG. 14 taken along line XV-XV.

FIG. 13 is an equivalent circuit diagram of one pixel in a liquid crystal display according to an exemplary embodiment, FIG. 14 is a layout view of a liquid crystal display according to an exemplary embodiment, and FIG. 15 is a cross-sectional view of the liquid crystal display of FIG. 14 taken along line XV-XV. The description that would be redundant with the description of FIG. 1 to FIG. 12 is omitted.

Referring to FIG. 13, a liquid crystal display includes signal lines including the first gate line GLn, the second gate line GLn+1, a common voltage line Vst, and a data line DL and a pixel PX connected thereto.

The pixel PX includes the first switching element Qa, the second switching element Qb, the third switching element Qc, the first liquid crystal capacitor Clca, the second liquid crystal capacitor Clcb, and a transformation capacitor Cstd.

The first and second switching elements Qa and Qb as three terminal elements provided in the lower panel 100 have a control terminal connected to the gate line GLn, an input terminal connected to the data line DL, and an output terminal connected to the first and second liquid crystal capacitors Clca and Clcb.

The third switching element Qc as a three terminal element such as the thin film transistor also provided in the lower panel 100 has a control terminal connected to the step-down gate line GLn+1, an input terminal connected to the second liquid crystal capacitor Clcb, and an output terminal connected to the transformation capacitor Cstd.

The transformation capacitor Cstd is connected to the output terminal of the third switching element Qc and the common voltage line Vst, and is formed by overlapping the common voltage line Vst provided in the lower panel 100 and the output terminal of the third switching element Qc via an insulator interposed therebetween.

Referring to FIG. 14 and FIG. 15, the first switching element Qa includes the first gate electrode 124a, a gate insulating layer 140, the first source electrode 173a, the first drain electrode 175a, the first semiconductor 154a, and the first ohmic contact members 163a and 165a. The second switching element Qb includes the first gate electrode 124b, the gate insulating layer 140, the first source electrode 173b, the first drain electrode 175b, the first semiconductor 154b, and the first ohmic contact members 163b and 165b. The first switching element Qc includes the first gate electrode 124c, the gate insulating layer 140, the first source electrode 173c, the first drain electrode 175c, the first semiconductor 154c, and the first ohmic contact members 163c and 165c.

The first drain electrode 175a is connected to the first pixel electrode 191a through the first contact hole 181a, and the first pixel electrode 191a and the common electrode 270 form the first liquid crystal capacitor Clca. The second drain electrode 175b is connected to the second pixel electrode 191b through the second contact hole 181b, and the second pixel electrode 191b and the common electrode 270 form the second liquid crystal capacitor Clcb.

The expansion 177 of the third drain electrode and the storage electrode 135 overlap each other via the gate insulating layer 140 to form the transformation capacitor Cstd.

The first gate line 121a, the second gate line 121b, and the storage electrode line 131 are disposed on the substrate 110. The first gate line 121a includes the first gate electrode 124a and the second gate electrode 124b, and the second gate line 121b includes the third gate electrode 124c.

The gate insulating layer 140 is disposed on the first gate line 121a, the second gate line 121b, and the storage electrode line 131.

The semiconductors 154a, 154b, and 154c are disposed on the gate insulating layer 140, the ohmic contacts 163a, 163b, 163c, 165a, 165b, and 165c are disposed on the semiconductors 154a, 154b, and 154c, and the source electrodes 173a, 173b, and 173c and the drain electrodes 175a, 175b, and 175c are disposed on the ohmic contacts 163a, 163b, 163c, 165a, 165b, and 165c. The semiconductors 154a, 154b, and 154c, the ohmic contacts 163a, 163b, 163c, 165a, 165b, and 165c, the source electrodes 173a, 173b, and 173c, and the drain electrodes 175a, 175b, and 175c are sequentially deposited and may be patterned by using one mask.

The first passivation layer 180p is disposed on the source electrodes 173a, 173b, and 173c and the drain electrodes 175a, 175b, and 175c.

A light blocking member 220 is disposed on the first passivation layer 180p, and a color filter 230 is disposed on a plurality of light blocking members 220. Alternatively, at least one light blocking member 220 and the color filter 230 may be included in the second display panel 200.

The second passivation layer 180q is disposed on the color filter 230. The first passivation layer 180p and the second passivation layer 180q form a passivation layer 180, and at least one thereof may include an organic insulating material. Also, one of the first passivation layer 180p and the second passivation layer 180q may be omitted.

Pixel electrodes 191a and 191b are disposed on the second passivation layer 180q.

When the alignment layer 11 is disposed on the pixel electrodes 191a and 191b, the alignment layer 11 may be the above-described alignment layer.

A common electrode 270 is disposed on the second substrate 210.

An overcoat (not shown) may be disposed on the common electrode 270.

An alignment layer 21 is disposed on the common electrode 270.

A liquid crystal layer 3 is disposed between the first display panel 100 and the second display panel 200.

Figure 16:
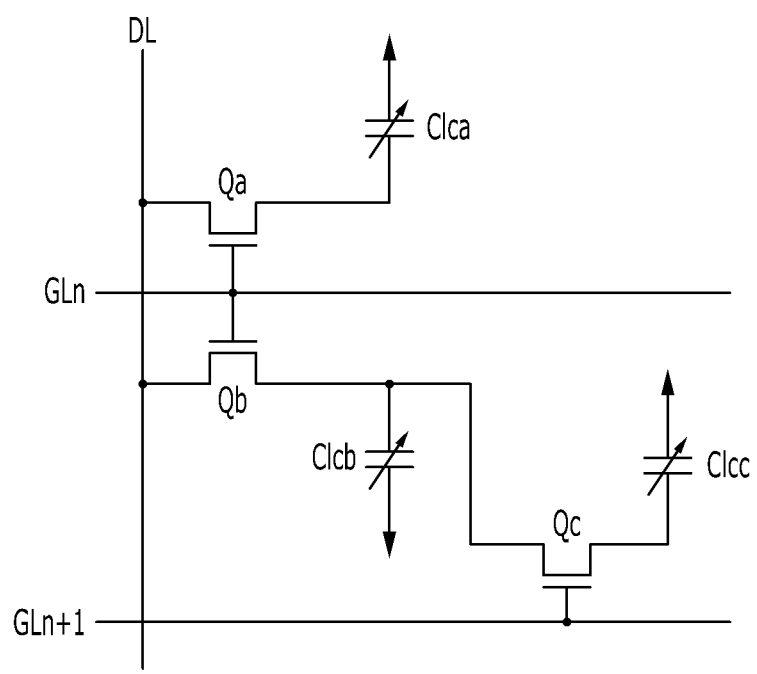
FIG. 16 is an equivalent circuit diagram of an exemplary embodiment of a pixel in a liquid crystal display.
Figure 17:
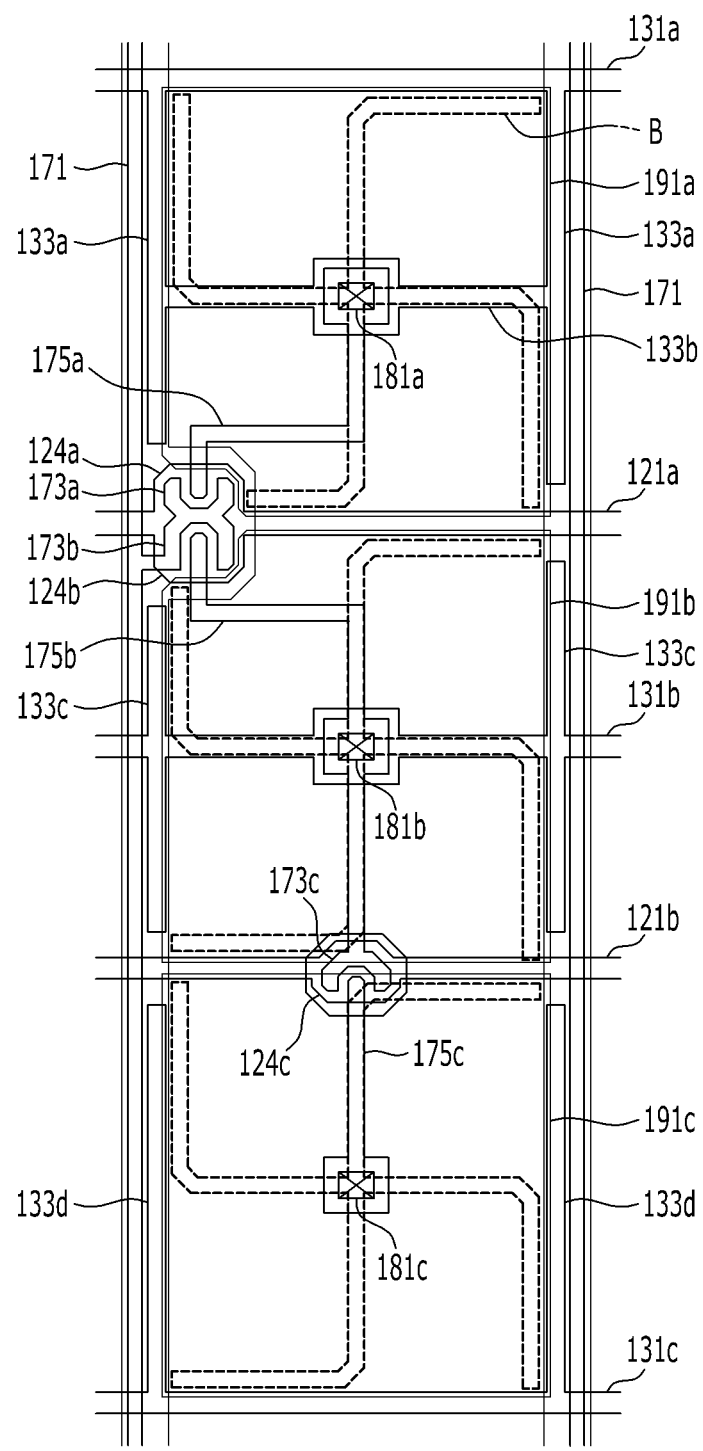
FIG. 17 is a layout view of an exemplary embodiment of a liquid crystal display.

FIG. 16 is an equivalent circuit diagram of one pixel in a liquid crystal display according to an exemplary embodiment, and FIG. 17 is a layout view of a liquid crystal display according to an exemplary embodiment. The description redundant with the above description of FIG. 1 to FIG. 12 is omitted.

Referring to FIG. 16, the liquid crystal display includes the first switching element Qa and the second switching element Qb, the first liquid crystal capacitor Clca connected to the first switching element Qa, the second liquid crystal capacitor Clcb connected to the second switching element Qb, the third switching element Qc connected to the second switching element Qb, and the third liquid crystal capacitor Clcc connected to the third switching element Qc.

The liquid crystal display further includes the first gate line GLn, the second gate line GLn+1, and the data line DL. The first switching element Qa and the second switching element Qb as the three terminal elements such as the thin film transistor are connected to the first gate line GLn to be switched by the same signal, and are connected to the data line DL to be applied with the same data signal. The third switching element Qc as the three terminal element such as the thin film transistor is connected to the second gate line GLn+1.

If the first gate line GLn is applied with the gate-on voltage, the first switching element Qa and the second switching element Qb are turned on and the data signal is applied to the data line DL such that the first liquid crystal capacitor Clca and the second liquid crystal capacitor Clcb are charged with the same voltage. Next, if the second gate line GLn+1 as the gate line of the next stage is applied with the gate-on voltage, the third switching element Qc is turned on such that a portion of the voltage charged to the second liquid crystal capacitor Clcb is charged to the third liquid crystal capacitor Clcc. Accordingly, a difference between the voltages charged to the first liquid crystal capacitor Clca and the second liquid crystal capacitor Clcb is generated, and thereby the lateral visibility of the liquid crystal display may be improved.

Referring to FIG. 16 and FIG. 17, the first and second gate lines 121a and 121b transmit the gate signal and extend mainly in the transverse direction. The first gate line 121a and the second gate line 121b are alternately disposed, and the first gate line 121a and the second gate line 121b are sequentially applied with the gate-on voltage.

The first gate line 121a includes a plurality of first gate electrodes 124a and second gate electrodes 124b protruding up and down. The first gate electrode 124a and the second gate electrode 124b are applied with the same gate signal from the first gate line 121a. The second gate line 121b includes a plurality of third gate electrodes 124c protruding therefrom.

A gate insulating layer (not shown) is formed on the first and second gate lines 121a and 121b. Semiconductors (not shown) of an island type are formed on the gate insulating layer. The semiconductors are disposed on the first, second, and third gate electrodes 124a, 124b, and 124c.

A plurality of data lines 171, the first source electrode 173a, the second source electrode 173b, the third source electrode 173c, the first drain electrode 175a, the second drain electrode 175b, and the third drain electrode 175c are formed on the semiconductor and the gate insulating layer.

The data line 171 transmitting the data signal extends mainly in the longitudinal direction, thereby intersecting the first and second gate lines 121a and 121b.

The first source electrode 173a is protruded from the data line 171 on the first gate electrode 124a, the second source electrode 173b is protruded from the data line 171 on the second gate electrode 124b, and the first source electrode 173a and the second source electrode 173b are connected as one constitution, thereby receiving the same data voltage from the data line 171. The first source electrode 173a is formed with a "U" shape on the first gate electrode 124a, and the second source electrode 173b is formed with a "U" shape on the second gate electrode 124b.

The first drain electrode 175a is separated from the first source electrode 173a and includes an end of a bar type facing the first source electrode 173a with respect to the first gate electrode 124a, and the bar end is partially enclosed by the first source electrode 173a curved with the "U" shape.

The second drain electrode 175b is separated from the second source electrode 173b and includes an end of a bar type facing the second source electrode 173b with respect to the second gate electrode 124b, and the bar end is partially enclosed by the second source electrode 173b curved with the "U" shape. The other end of the second drain electrode 175b is connected to the third source electrode 173c.

The third source electrode 173 is extended from the second drain electrode 175b and is formed with the "U" shape on the third gate electrode 124c. The third drain electrode 175c is separated from the third source electrode 173c and includes an end of a bar type facing the third source electrode 173c with respect to the third gate electrode 124c, and the bar end is partially enclosed by the third source electrode 173c curved with the "U" shape.

The first gate electrode 124a, the first source electrode 173a, and the first drain electrode 175a form the first switching element Qa (referring to FIG. 1), the second gate electrode 124b, the second source electrode 173b, and the second drain electrode 175b form the second switching element Qb (referring to FIG. 1), and the third gate electrode 124c, the third source electrode 173c, and the third drain electrode 175c form the third switching element Qc (referring to FIG. 1).

A passivation layer (not shown) is formed on the data line 171, the first, second, and third source electrodes 173a, 173b, and 173c, and the first, second, and third drain electrodes 175a, 175b, and 175c. The passivation layer may be made of an inorganic insulator or organic insulator, may have a flat surface, and may have a dual-layer structure in which an inorganic layer is a lower layer and an organic layer is an upper layer so that an excellent insulating characteristic of the organic layer is ensured while preventing the exposed semiconductor portion from being damaged.

The passivation layer has a first contact hole 181a that partially exposes a portion of the first drain electrode 175a, a second contact hole 181b that partially exposes a portion of the second drain electrode 175b, and a third contact hole 181c that partially exposes a portion of the third drain electrode 175c.

A plurality of first subpixel electrodes 191a, second subpixel electrodes 191b, and third subpixel electrodes 191c made of a transparent electrode material such as indium tin oxide ("ITO") or indium zinc oxide ("IZO") are formed on the passivation layer. The first subpixel electrode 191a is connected to the first drain electrode 175a through the first contact hole 181a, the second subpixel electrode 191b is connected to the second drain electrode 175b through the second contact hole 181b, and the third subpixel electrode 191c is connected to the third drain electrode 175c through the third contact hole 181c.

With respect to the first gate line 121a, the first subpixel electrode 191a is formed at the upper side and the second subpixel electrode 191b is formed at the lower side. Also, with respect to the second gate line 121b, the second subpixel electrode 191b is formed at the upper side and the third subpixel electrode 191c is formed at the lower side. In other words, the second subpixel electrode 191b is formed between the first gate line 121a and the second gate line 121b. Here, the first subpixel electrode 191a, the second subpixel electrode 191b, and the third subpixel electrode 191c are shown with the same size, however they may have different sizes.

Although not shown, a common electrode is formed on the second substrate facing and combined with the first substrate, and the liquid crystal layer is formed between the first substrate and the second substrate.

The first subpixel electrode 191a and the second subpixel electrode 191b form the first and second liquid crystal capacitors Clca and Clcb (referring to FIG. 1) along with the common electrode formed on the second substrate and the liquid crystal layer therebetween such that the voltage is maintained after the first and second switching elements Qa and Qb are turned off.

The third subpixel electrode 191a forms the third liquid crystal capacitor Clcc (referring to FIG. 1) along with the common electrode of the second substrate and the liquid crystal layer formed therebetween, and a portion of the voltage charged to the second liquid crystal capacitor Clcb is charged to the third liquid crystal capacitor Clcc such that a difference between the voltages charged to the first liquid crystal capacitor Clca and the second liquid crystal capacitor Clcb is generated. Here, the voltage of the second subpixel electrode 191b is similar to the voltage of the third subpixel electrode 191c.

A liquid crystal display according to an exemplary embodiment may further include a plurality of the first, second, and third storage electrode lines 131a, 131b, and 131c formed with the same layer as the first and second gate line 121a and 121b.

The first, second, and third storage electrode lines 131a, 131b, and 131c are applied with a predetermined voltage, are separated from the first and second gate lines 121a and 121b, and extend in the direction parallel thereto. The first, second, and third storage electrode lines 131a, 131b, and 131c include the first, second, third, and fourth storage electrodes 133a, 133b, 133c, and 133d expanded therefrom.

The first storage electrode line 131a is formed at the upper side of the first subpixel electrode 191a, the second storage electrode line 131b is formed to overlap the center portion of the second subpixel electrode 191b, and the third storage electrode line 131c is formed at the lower side of the third subpixel electrode 191c.

The first storage electrode 133a is protruded from the first storage electrode line 131a to partially overlap the right and left ends of the first subpixel electrode 191a.

The second storage electrode 133b is formed in the direction parallel to the first gate line 121a to overlap the center portion of the first subpixel electrode 191a. The second storage electrode 133b is formed to connect the first storage electrode 133a formed at the left side of the first subpixel 191a and the first storage electrode 133a formed at the right side.

Here, the first storage electrode 133a may be formed to overlap at least one of the right and left ends of the first subpixel electrode 191a. Here, the second storage electrode 133b is formed to be connected to the first storage electrode 133a formed at one side.

The third storage electrode 133c is protruded from the second storage electrode line 131b to overlap the right and left ends of the second subpixel electrode 191b.

The fourth storage electrode 133d is protruded from the third storage electrode line 131c to partially overlap the right and left ends of the third subpixel electrode 191c.

Here, the third and fourth storage electrodes 133c and 133d may be formed to overlap one of the right and left ends of the second and third subpixel electrodes 191b and 191c.

Also, the shape and the arrangement of the first, second, and third storage electrode lines 131a, 131b, and 131c and the first, second, third, and fourth storage electrodes 133a, 133b, 133c, and 133d may be various.

The data voltage input to the data line 171 is changed according to time, and this affects the voltage of the first, second, and third subpixel electrodes 191a, 191b, and 191c. The first storage electrode 133a, the third storage electrode 133c, and the fourth storage electrode 133d are close to the data line 171 to overlap a portion of the first, second, and third subpixel electrodes 191a, 191b, and 191c, thereby preventing the influence of the data voltage.

The above-described alignment layer may be formed on the first and second substrates of the liquid crystal display, and light is irradiated to the alignment layer, thereby realizing the photo-alignment controlling the alignment direction and the alignment angle of the liquid crystal. According to the photo-alignment method, the aperture ratio may be increased and the response speed of the liquid crystal may be improved, however s portion where the alignment directions are different is executed at the boundary of the different domains such that texture may be generated.

In FIG. 17, the portion indicated by "B" as the region where the texture is generated is displayed with higher luminance than other regions. Accordingly, by covering the corresponding portion, the influence due to the texture may be reduced. Among them, the vertical line portion that crosses the center of the first, second, and third subpixel electrodes 191a, 191b, and 191c does not have a large difference in the luminance of the other region in views of a side and a front thereof because the liquid crystal lies at an angle of 0 degrees. On the other hand, the horizontal line portion that crosses the center of the first, second, and third subpixel electrodes 191a, 191b, and 191c has a large difference in the luminance of the other region in views of a side thereof because the liquid crystal stands at an angle of 90 degrees.

Therefore, the second storage electrode 133b and the second storage electrode line 131b may be formed so that they cover the horizontal line portion that crosses the center of the first subpixel electrode 191a, the second subpixel electrode 191b, and the third subpixel electrode 191c, thereby preventing the effect of the texture.

The light blocking member corresponding to the third subpixel electrode 191c may not be formed on the second substrate. In other words, the third subpixel electrode 191c has the function of displaying the images through the light passing through the third subpixel electrode 191c as well as the function of decreasing the voltage of the second subpixel electrode 191b.

The voltages of the second subpixel electrode 191b and the third subpixel electrode 191c may be the same, and the voltage of the first subpixel electrode 191a may be higher than the voltage of the second and third subpixel electrodes 191b and 191c. In other words, one pixel is divided into three subpixels, however two of them have the same voltages such that two grays are displayed. Here, if three subpixels are applied with three different voltages, the improvement of the lateral visibility may be further advantageous.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A liquid crystal display comprising:
a first substrate and a second substrate facing each other;
an alignment layer disposed on at least one of the first substrate and the second substrate, the alignment layer comprising
a vertical photo-alignment material which comprises a first vertical functional group and a photo-reactive group, and
a first alignment material which does not include the photo-reactive group; and a liquid crystal layer disposed between the first substrate and the second substrate, wherein the vertical photo-alignment material and the first alignment material are in a micro-phase separation state from each other, wherein the photo-reactive group is reacted with light which is illuminated onto the alignment layer in the micro-phase separation state, wherein a ratio of a molar concentration of the vertical photo-alignment material to a molar concentration of the first alignment material increases in a direction towards a surface of the alignment layer adjacent to the liquid crystal layer, wherein a weight ratio of the vertical photo-alignment material and the first alignment material is about 10:90 to about 30:70.

2. The liquid crystal display of claim 1, wherein the vertical photo-alignment material comprises a photo-reactive diamine group and a vertical diamine group.

3. The liquid crystal display of claim 2, wherein the photo-reactive diamine group comprises
a first diamine group, and
a first linking group bonded to the first diamine group, wherein
the photo-reactive group is bonded to the first linking group, and
the first vertical functional group is bonded to the photo-reactive group.

4. The liquid crystal display of claim 3, wherein the vertical diamine group comprises
a second diamine group,
a second linking group bonded to the second diamine group, and
a second vertical functional group bonded to the second linking group.

5. The liquid crystal display of claim 4, wherein the vertical photo-alignment material comprises the photo-reactive diamine group in an amount of about 40 mole percent to about 70 mole percent, based on the total moles of the vertical photo-alignment material, and the vertical diamine group in an amount of about 10 mole percent to about 40 mole percent, based on the total moles of the vertical photo-alignment material.

6. The liquid crystal display of claim 2, wherein the vertical diamine group comprises
a second diamine group,
a second linking group bonded to the second diamine group, and
a second vertical functional group bonded to the second linking group.

7. The liquid crystal display of claim 2, wherein the vertical photo-alignment material includes the photo-reactive diamine group in an amount of about 40 mole percent to about 70 mole percent, based on the total moles of the vertical photo-alignment material, and the vertical diamine group in an amount of about 10 mole percent to about 40 mole percent, based on the total moles of the vertical photo-alignment material.

8. The liquid crystal display of claim 2, wherein the vertical photo-alignment material includes two or more types of the photo-reactive diamine groups.

9. The liquid crystal display of claim 2, wherein the vertical photo-alignment material further comprises
a third diamine group which does not comprise the photo-reactive group or the vertical functional group.

10. The liquid crystal display of claim 9, wherein the vertical photo-alignment material includes the third diamine group in an amount of less than about 20 mole percent, based on the total moles of the vertical photo-alignment material.

11. The liquid crystal display of claim 9, wherein the alignment layer includes
the photo-reactive diamine group in an amount of about 4 mole percent to about 28 mole percent, based on the total moles of the vertical photo-alignment material,
the vertical diamine group in an amount of about 1 mole percent to about 16 mole percent, based on the total moles of the vertical photo-alignment material, and
the third diamine group in an amount of about 60 mole percent to about 92 mole percent, based on the total moles of the vertical photo-alignment material.

12. The liquid crystal display of claim 9, wherein the alignment layer includes
the photo-reactive diamine group in an amount of about 4 mole percent to about 28 mole percent, based on the total moles of the vertical photo-alignment material,
the vertical diamine group at about 1 mole percent to about 16 mole percent, based on the total moles of the vertical photo-alignment material, and
the third diamine group at about 60 mole percent to about 92 mole percent, based on the total moles of the vertical photo-alignment material.

13. The liquid crystal display of claim 1, wherein the vertical photo-alignment material is a polyamic acid compound represented by Formula 22, or a polyimide compound represented by Formula 23:

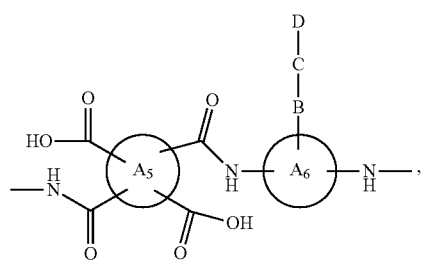

Formula 22

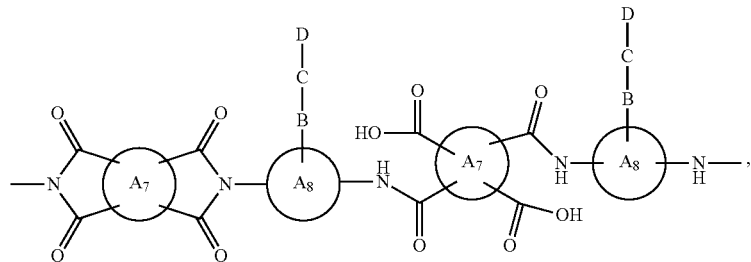

Formula 23 wherein, in Formula 22 and Formula 23,
  $A_5$-$A_8$ are each independently a substituted or unsubstituted $C_6$-$C_{24}$ aryl group or a substituted or unsubstituted $C_3$-$C_{24}$ cycloalkyl group,
  B is a linking group,
  C is a photo-reactive group, and
  D is a vertical functional group.

14. The liquid crystal display of claim 1, wherein
the first alignment material is a polyamic acid compound represented by Formula 24, or a polyimide compound represented by Formula 25:

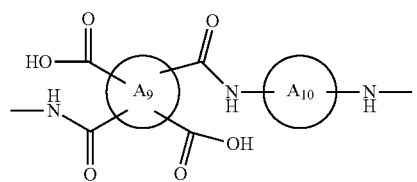

Formula 24

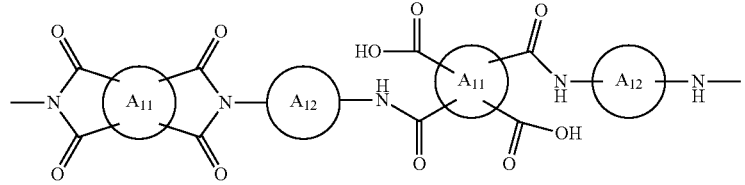

Formula 25 wherein, in Formula 24 and Formula 25,
  $A_9$-$A_{12}$ are each independently a substituted or unsubstituted $C_6$-$C_{24}$ aryl group or a substituted or unsubstituted $C_3$-$C_{24}$ cycloalkyl group.

15. The liquid crystal display of claim 2, wherein
the first alignment material is a polyamic acid compound represented by Formula 24, or a polyimide compound represented by Formula 25:

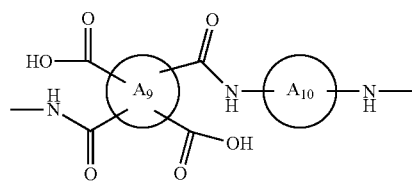

Formula 24

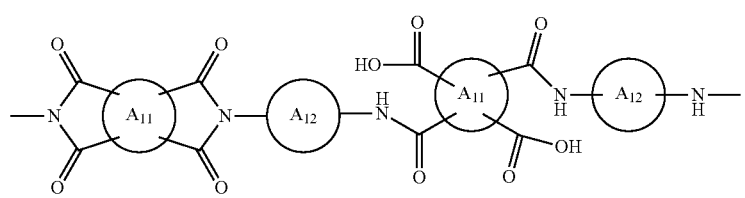

Formula 25 wherein, in Formula 24 and Formula 25, $A_9$-$A_{12}$ are each independently a substituted or unsubstituted $C_6$-$C_{24}$ aryl group or a substituted or unsubstituted $C_3$-$C_{24}$ cycloalkyl group.

16. The liquid crystal display of claim 1, wherein a position of the first vertical functional group in the alignment layer is selected based on a ratio of the molar concentration of the vertical photo-alignment material to the molar concentration of the first alignment material.

17. The liquid crystal display of claim 16, wherein the first vertical functional group is disposed a distance of about 5 percent to about 50 percent of a thickness of the alignment layer from a surface of the alignment layer adjacent to the liquid crystal layer.

18. The liquid crystal display of claim 1, wherein the first alignment material includes a third vertical functional group in an amount of less than about 5 mole percent, based on the total moles of the first alignment material.

19. The liquid crystal display of claim 1, wherein the vertical photo-alignment material includes an imide group in an amount of about 40 mole percent to about 70 mole percent, based on the total moles of the vertical photo-alignment material.

20. The liquid crystal display of claim 19, wherein the first alignment material includes an imide group in an amount of about 50 mole percent to about 80 mole percent, based on the total moles of the first alignment material.

21. The liquid crystal display of claim 1, wherein the vertical photo-alignment material is a polyimide compound represented by Formula 23:

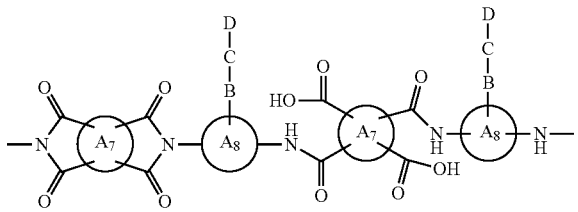

Formula 23 wherein, in Formula 23,
$A_7$ and $A_8$ are each independently a substituted or unsubstituted $C_6$-$C_{24}$ aryl group or a substituted or unsubstituted $C_3$-$C_{24}$ cycloalkyl group,
each B is independently a linking group,
each C is independently a photo-reactive group, and
each D is independently a vertical functional group.

22. The liquid crystal display of claim 21, wherein the first alignment material is a polyimide compound represented by Formula 25:

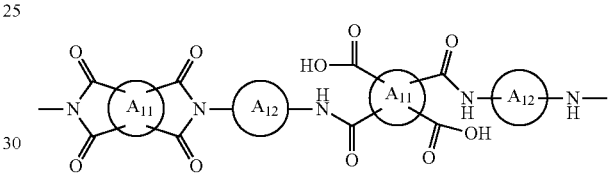

Formula 25 wherein, in Formula 25,
$A_{11}$ and $A_{12}$ are each independently a substituted or unsubstituted $C_6$-$C_{24}$ aryl group or a substituted or unsubstituted $C_3$-$C_{24}$ cycloalkyl group.

* * * * *